United States Patent
Kaasila et al.

(10) Patent No.: US 9,569,865 B2
(45) Date of Patent: Feb. 14, 2017

(54) SUPPORTING COLOR FONTS

(71) Applicant: Monotype Imaging Inc., Woburn, MA (US)

(72) Inventors: Sampo Juhani Kaasila, Plaistow, NH (US); Daniel Robert Orcutt, Boxford, MA (US); Mark Peter Lepper, Wellesley, MA (US)

(73) Assignee: Monotype Imaging Inc., Woburn, MA (US)

( * ) Notice: Subject to any disclaimer, the term of this patent is extended or adjusted under 35 U.S.C. 154(b) by 234 days.

(21) Appl. No.: 14/135,973

(22) Filed: Dec. 20, 2013

(65) Prior Publication Data

US 2014/0176563 A1  Jun. 26, 2014

Related U.S. Application Data

(60) Provisional application No. 61/745,153, filed on Dec. 21, 2012.

(51) Int. Cl.
| | | |
|---|---|---|
| *G06T 11/00* | (2006.01) | |
| *G06T 11/20* | (2006.01) | |
| *G06F 17/21* | (2006.01) | |

(52) U.S. Cl.
CPC .......... *G06T 11/203* (2013.01); *G06F 17/214* (2013.01)

(58) Field of Classification Search
CPC .............................. G06T 11/203; G06F 17/214
See application file for complete search history.

(56) References Cited

U.S. PATENT DOCUMENTS

| | | | |
|---|---|---|---|
| 4,244,657 | A | 1/1981 | Wasylyk |
| 4,998,210 | A | 3/1991 | Kadono |
| 5,347,266 | A | 9/1994 | Bauman et al. |
| 5,412,771 | A | 5/1995 | Fenwick |
| 5,416,898 | A | 5/1995 | Opstad et al. |
| 5,444,829 | A | 8/1995 | Kawabata et al. |
| 5,453,938 | A | 9/1995 | Gohara et al. |
| 5,526,477 | A | 6/1996 | McConnell et al. |
| 5,528,742 | A | 6/1996 | Moore et al. |
| 5,533,174 | A | 7/1996 | Flowers et al. |

(Continued)

FOREIGN PATENT DOCUMENTS

| | | |
|---|---|---|
| EP | 2166488 A2 | 3/2010 |
| EP | 2857983 | 4/2015 |

(Continued)

OTHER PUBLICATIONS

Adobe Systems Incorporated, "The Type 42 Font Format Specification," Technical Note #5012, Jul. 31, 1998, pp. 1-24.

(Continued)

*Primary Examiner* — Charles Tseng
(74) *Attorney, Agent, or Firm* — Fish & Richardson P.C.

(57) ABSTRACT

A system includes a computing device that includes a memory configured to store instructions. The computing device also includes a processor to execute the instructions to perform operations that include receiving information that indicates whether an asset presenter being executed by a computing device is capable of presenting one or more colored fonts of a web asset. In response to receiving the information, sending color font information to the computing device to allow content of the web asset represented in colored fonts to be presented by the computing device.

37 Claims, 9 Drawing Sheets

(56) References Cited

U.S. PATENT DOCUMENTS

| | | | |
|---|---|---|---|
| 5,586,242 A | 12/1996 | McQueen et al. | |
| 5,606,649 A | 2/1997 | Tai | |
| 5,619,721 A | 4/1997 | Maruko | |
| 5,630,028 A | 5/1997 | DeMeo | |
| 5,737,599 A | 4/1998 | Rowe et al. | |
| 5,748,975 A | 5/1998 | Van De Vanter | |
| 5,757,384 A | 5/1998 | Ikeda | |
| 5,781,714 A | 7/1998 | Collins et al. | |
| 5,877,776 A | 3/1999 | Beaman et al. | |
| 5,940,581 A | 8/1999 | Lipton | |
| 5,995,718 A | 11/1999 | Hiraike | |
| 6,012,071 A | 1/2000 | Krishna et al. | |
| 6,016,142 A | 1/2000 | Chang | |
| 6,031,549 A | 2/2000 | Hayes-Roth | |
| 6,044,205 A | 3/2000 | Reed et al. | |
| 6,065,008 A | 5/2000 | Simon et al. | |
| 6,073,147 A | 6/2000 | Chan et al. | |
| 6,111,654 A * | 8/2000 | Cartier | G06K 15/02 358/1.1 |
| 6,141,002 A | 10/2000 | Kanungo et al. | |
| 6,249,908 B1 | 6/2001 | Stamm | |
| 6,252,671 B1 | 6/2001 | Peng et al. | |
| 6,282,327 B1 | 8/2001 | Betrisey | |
| 6,313,920 B1 | 11/2001 | Dresevic et al. | |
| 6,320,587 B1 | 11/2001 | Funyu | |
| 6,330,577 B1 | 12/2001 | Kim | |
| 6,343,301 B1 | 1/2002 | Halt et al. | |
| 6,426,751 B1 | 7/2002 | Patel | |
| 6,490,051 B1 | 12/2002 | Nguyen et al. | |
| 6,512,531 B1 | 1/2003 | Gartland | |
| 6,522,330 B2 | 2/2003 | Kobayashi | |
| 6,522,347 B1 | 2/2003 | Tsuji | |
| 6,583,789 B1 | 6/2003 | Carlson et al. | |
| 6,657,625 B1 | 12/2003 | Chik et al. | |
| 6,675,358 B1 | 1/2004 | Kido | |
| 6,678,688 B1 | 1/2004 | Unruh | |
| 6,687,879 B1 | 2/2004 | Teshima | |
| 6,704,116 B1 | 3/2004 | Abulhab | |
| 6,704,648 B1 | 3/2004 | Naik et al. | |
| 6,718,519 B1 | 4/2004 | Taieb | |
| 6,738,526 B1 | 5/2004 | Betrisey | |
| 6,754,875 B1 | 6/2004 | Paradies | |
| 6,760,029 B1 | 7/2004 | Phinney et al. | |
| 6,771,267 B1 | 8/2004 | Muller | |
| 6,810,504 B2 | 10/2004 | Cooper et al. | |
| 6,813,747 B1 | 11/2004 | Taieb | |
| 6,853,980 B1 | 2/2005 | Ying et al. | |
| 6,856,317 B2 | 2/2005 | Konsella et al. | |
| 6,882,344 B1 | 4/2005 | Hayes et al. | |
| 6,901,427 B2 | 5/2005 | Teshima | |
| 6,907,444 B2 | 6/2005 | Narasimhan et al. | |
| 6,952,210 B1 | 10/2005 | Renner et al. | |
| 6,993,538 B2 | 1/2006 | Gray | |
| 7,050,079 B1 | 5/2006 | Estrada et al. | |
| 7,064,757 B1 | 6/2006 | Opstad et al. | |
| 7,064,758 B2 | 6/2006 | Chik et al. | |
| 7,155,672 B1 | 12/2006 | Adler et al. | |
| 7,184,046 B1 | 2/2007 | Hawkins | |
| 7,188,313 B2 | 3/2007 | Hughes et al. | |
| 7,228,501 B2 | 6/2007 | Brown et al. | |
| 7,346,845 B2 | 3/2008 | Teshima et al. | |
| 7,477,988 B2 | 1/2009 | Dorum | |
| 7,492,365 B2 | 2/2009 | Corbin et al. | |
| 7,505,040 B2 | 3/2009 | Stamm et al. | |
| 7,539,939 B1 | 5/2009 | Schomer | |
| 7,552,008 B2 | 6/2009 | Newstrom et al. | |
| 7,580,038 B2 | 8/2009 | Chik et al. | |
| 7,583,397 B2 | 9/2009 | Smith | |
| 7,636,885 B2 | 12/2009 | Merz et al. | |
| 7,701,458 B2 | 4/2010 | Sahuc et al. | |
| 7,752,222 B1 | 7/2010 | Cierniak | |
| 7,768,513 B2 | 8/2010 | Klassen | |
| 7,836,094 B2 | 11/2010 | Ornstein et al. | |
| 7,882,432 B2 | 2/2011 | Nishikawa et al. | |
| 7,937,658 B1 | 5/2011 | Lunde | |
| 7,944,447 B2 | 5/2011 | Clegg et al. | |
| 7,958,448 B2 | 6/2011 | Fattic et al. | |
| 8,098,250 B2 | 1/2012 | Clegg et al. | |
| 8,116,791 B2 | 2/2012 | Agiv | |
| 8,201,088 B2 | 6/2012 | Levantovsky et al. | |
| 8,201,093 B2 | 6/2012 | Tuli | |
| 8,306,356 B1 | 11/2012 | Bever | |
| 8,381,115 B2 | 2/2013 | Tranchant et al. | |
| 8,413,051 B2 | 4/2013 | Bacus et al. | |
| 8,601,374 B2 | 12/2013 | Parham | |
| 8,643,652 B2 | 2/2014 | Kaplan | |
| 8,644,810 B1 | 2/2014 | Boyle | |
| 8,643,542 B2 | 4/2014 | Kaplan | |
| 8,689,101 B2 | 4/2014 | Fux et al. | |
| 8,731,905 B1 | 5/2014 | Tsang | |
| 2001/0052901 A1 | 12/2001 | Kawabata et al. | |
| 2002/0010725 A1 | 1/2002 | Mo | |
| 2002/0033824 A1 | 3/2002 | Stamm | |
| 2002/0052916 A1 | 5/2002 | Kloba et al. | |
| 2002/0057853 A1 | 5/2002 | Usami | |
| 2002/0087702 A1 | 7/2002 | Mori | |
| 2002/0093506 A1 | 7/2002 | Hobson | |
| 2002/0174186 A1 | 11/2002 | Hashimoto et al. | |
| 2002/0194261 A1 | 12/2002 | Teshima | |
| 2003/0014545 A1 | 1/2003 | Broussard et al. | |
| 2003/0076350 A1 | 4/2003 | Vu | |
| 2003/0197698 A1 | 10/2003 | Perry et al. | |
| 2004/0025118 A1 | 2/2004 | Renner | |
| 2004/0088657 A1 | 5/2004 | Brown et al. | |
| 2004/0119714 A1 | 6/2004 | Everett et al. | |
| 2004/0177056 A1 | 9/2004 | Davis et al. | |
| 2004/0189643 A1 | 9/2004 | Frisken et al. | |
| 2004/0207627 A1 | 10/2004 | Konsella et al. | |
| 2004/0233198 A1 | 11/2004 | Kubo | |
| 2005/0033814 A1 | 2/2005 | Ota | |
| 2005/0094173 A1 | 5/2005 | Engelman et al. | |
| 2005/0111045 A1 | 5/2005 | Imai | |
| 2005/0128508 A1 | 6/2005 | Greef et al. | |
| 2005/0149942 A1 | 7/2005 | Venkatraman | |
| 2005/0190186 A1 | 9/2005 | Klassen | |
| 2005/0193336 A1 | 9/2005 | Fux et al. | |
| 2005/0200871 A1 | 9/2005 | Miyata | |
| 2005/0264570 A1 | 12/2005 | Stamm | |
| 2005/0270553 A1 | 12/2005 | Kawara | |
| 2005/0275656 A1 | 12/2005 | Corbin et al. | |
| 2006/0010371 A1 | 1/2006 | Shur et al. | |
| 2006/0017731 A1 | 1/2006 | Matskewich et al. | |
| 2006/0061790 A1 | 3/2006 | Miura | |
| 2006/0072136 A1 | 4/2006 | Hodder et al. | |
| 2006/0072137 A1 | 4/2006 | Nishikawa et al. | |
| 2006/0072162 A1 | 4/2006 | Nakamura | |
| 2006/0103653 A1 | 5/2006 | Chik et al. | |
| 2006/0103654 A1 | 5/2006 | Chik et al. | |
| 2006/0168639 A1 | 7/2006 | Gan | |
| 2006/0241861 A1 | 10/2006 | Takashima | |
| 2006/0245727 A1 | 11/2006 | Nakano et al. | |
| 2006/0267986 A1 | 11/2006 | Bae et al. | |
| 2006/0269137 A1 | 11/2006 | Evans | |
| 2006/0285138 A1 | 12/2006 | Merz et al. | |
| 2007/0002016 A1 | 1/2007 | Cho et al. | |
| 2007/0006076 A1 | 1/2007 | Cheng | |
| 2007/0008309 A1 | 1/2007 | Sahuc et al. | |
| 2007/0050419 A1 | 3/2007 | Weyl et al. | |
| 2007/0055931 A1 | 3/2007 | Zaima | |
| 2007/0139412 A1 | 6/2007 | Stamm | |
| 2007/0139413 A1 | 6/2007 | Stamm et al. | |
| 2007/0159646 A1 | 7/2007 | Adelberg et al. | |
| 2007/0172199 A1 | 7/2007 | Kobayashi | |
| 2007/0211062 A1 | 9/2007 | Engleman et al. | |
| 2007/0283047 A1 | 12/2007 | Theis et al. | |
| 2008/0028304 A1 | 1/2008 | Levantovsky et al. | |
| 2008/0030502 A1 | 2/2008 | Chapman | |
| 2008/0154911 A1 | 6/2008 | Cheng | |
| 2008/0282186 A1 | 11/2008 | Basavaraju | |
| 2008/0303822 A1 | 12/2008 | Taylor | |
| 2008/0306916 A1 | 12/2008 | Gonzalez et al. | |
| 2009/0031220 A1 | 1/2009 | Tranchant | |
| 2009/0063964 A1 | 3/2009 | Huang | |
| 2009/0119678 A1 | 5/2009 | Shih | |

(56) References Cited

U.S. PATENT DOCUMENTS

| | | | |
|---|---|---|---|
| 2009/0158134 A1* | 6/2009 | Wang | G06F 17/211 715/222 |
| 2009/0183069 A1 | 7/2009 | Duggan et al. | |
| 2009/0275351 A1 | 11/2009 | Jeung et al. | |
| 2009/0287998 A1 | 11/2009 | Kalra | |
| 2009/0303241 A1 | 12/2009 | Priyadarshi et al. | |
| 2009/0307585 A1 | 12/2009 | Tranchant et al. | |
| 2010/0014104 A1 | 1/2010 | Soord | |
| 2010/0088606 A1 | 4/2010 | Kanno | |
| 2010/0088694 A1 | 4/2010 | Peng | |
| 2010/0091024 A1 | 4/2010 | Myadam | |
| 2010/0115454 A1 | 5/2010 | Tuli | |
| 2010/0164984 A1 | 7/2010 | Rane | |
| 2010/0218086 A1 | 8/2010 | Howell et al. | |
| 2010/0231598 A1 | 9/2010 | Hernandez et al. | |
| 2010/0275161 A1 | 10/2010 | DiCamillo | |
| 2010/0321393 A1 | 12/2010 | Levantovsky | |
| 2011/0090229 A1 | 4/2011 | Bacus et al. | |
| 2011/0090230 A1 | 4/2011 | Bacus et al. | |
| 2011/0093565 A1 | 4/2011 | Bacus et al. | |
| 2011/0115797 A1 | 5/2011 | Kaplan | |
| 2011/0131153 A1 | 6/2011 | Grim, III | |
| 2011/0188761 A1 | 8/2011 | Boutros et al. | |
| 2011/0238495 A1 | 9/2011 | Kang | |
| 2011/0271180 A1 | 11/2011 | Lee | |
| 2011/0276872 A1 | 11/2011 | Kataria | |
| 2011/0289407 A1 | 11/2011 | Naik | |
| 2011/0310432 A1 | 12/2011 | Waki | |
| 2012/0001922 A1 | 1/2012 | Escher et al. | |
| 2012/0016964 A1 | 1/2012 | Veen et al. | |
| 2012/0033874 A1 | 2/2012 | Perronnin | |
| 2012/0066590 A1 | 3/2012 | Harris et al. | |
| 2012/0072978 A1* | 3/2012 | DeLuca | G06F 17/214 726/7 |
| 2012/0092345 A1 | 4/2012 | Joshi et al. | |
| 2012/0102176 A1 | 4/2012 | Lee et al. | |
| 2012/0102391 A1 | 4/2012 | Lee et al. | |
| 2012/0127069 A1 | 5/2012 | Santhiveeran et al. | |
| 2012/0134590 A1 | 5/2012 | Petrou | |
| 2012/0215640 A1 | 8/2012 | Ramer et al. | |
| 2012/0288190 A1 | 11/2012 | Tang | |
| 2012/0306852 A1 | 12/2012 | Taylor | |
| 2012/0307263 A1 | 12/2012 | Ichikawa et al. | |
| 2012/0323694 A1 | 12/2012 | Lita et al. | |
| 2012/0323971 A1 | 12/2012 | Pasupuleti | |
| 2013/0033498 A1 | 2/2013 | Linnerud | |
| 2013/0120396 A1 | 5/2013 | Kaplan | |
| 2013/0127872 A1 | 5/2013 | Kaplan | |
| 2013/0163027 A1 | 6/2013 | Shustef | |
| 2013/0179761 A1 | 7/2013 | Cho | |
| 2013/0215126 A1 | 8/2013 | Roberts | |
| 2013/0215133 A1 | 8/2013 | Gould et al. | |
| 2013/0321617 A1 | 12/2013 | Lehmann | |
| 2014/0025756 A1 | 1/2014 | Kamens | |
| 2014/0153012 A1 | 6/2014 | Seguin | |
| 2015/0100882 A1 | 4/2015 | Severenuk | |
| 2015/0193386 A1 | 7/2015 | Wurtz | |

FOREIGN PATENT DOCUMENTS

| | | |
|---|---|---|
| JP | 06-258982 | 9/1994 |
| JP | 10-124030 | 5/1998 |
| JP | 2002-507289 | 3/2002 |
| JP | 05-215915 | 8/2005 |
| JP | 05-217816 | 8/2005 |
| JP | 07-011733 | 1/2007 |
| TW | 544595 | 8/2003 |
| TW | 2005/11041 | 3/2005 |
| WO | WO 94/23379 | 10/1994 |
| WO | WO 99/00747 | 1/1999 |
| WO | WO 01/91088 | 11/2001 |
| WO | WO 03/023614 | 3/2003 |
| WO | WO 2004/012099 | 2/2004 |
| WO | WO 2005/001675 | 1/2005 |

OTHER PUBLICATIONS

Adobe Systems Incorporated, "PostScript Language Reference—Third Edition," Feb. 1999, pp. 313-390.
Adobe Systems Incorporated, "To Unicode Mapping File Tutorial," Adobe Technical Note, XP002348387, May 2003.
"Announcing Speakeasy: A new open-source language tool from Typekit," Oct. 28, 2010, on-line http://blog.typekit.com/2010/10/28/announcing-speakeasy-a-new-open-source-language-tool-from-typekit/.
Apple Computers, "The True Type Font File," Oct. 27, 2000, pp. 1-17.
Celik et al., "W3C, CSS3 Module: Fonts," W3C Working Draft, Jul. 31, 2001, pp. 1-30.
International Search Report & Written Opinion issued in PCT application No. PCT/US10/01272, mailed Jun. 15, 2010, 6 pages.
International Search Report & Written Opinion issued in PCT application No. PCT/US2011/034050 dated Jul. 15, 2011, 13 pages.
International Search Report & Written Opinion, PCT/US2013/026051, mailed Jun. 5, 2013, 9 pages.
Japanese Office Action, 2009-521768, mailed Aug. 28, 2012.
Supplementary European Search Report, European Patent Office, European patent application No. EP 07796924, dated Dec. 27, 2010, 8 pages.
TrueType Fundamentals, Microsoft Typography, Nov. 1997, pp. 1-17.
Extensis, Suitcase 10.2, Quick Start Guide for Macintosh, 2001, 23 pgs.
International Search Report & Written Opinion, PCT/US2013/071519, mailed Mar. 5, 2013, 12 pages.
Open Text Exceed, User's Guide, Version 14, Nov. 2009, 372 pgs.
Universal Type Server, Upgrading from Suitcase Server, Sep. 29, 2009, 18 pgs.
Japanese Office Action, 2013-508184, mailed Apr. 1, 2015.
International Preliminary Report on Patentability issued in PCT application No. PCT/US2013/071519 dated Jun. 9, 2015, 9 pages.
"A first experiment with multicoloured web fonts," Manufactura Independente website, Feb. 28, 2011, Retrieved from the internet: http://blog.manufacturaindependente.org/2011/02/a-first-experiment-with-multicoloured-web-fonts/.
"colorfont/v1," Feb. 28, 2011, retrieved from the internet: http://manufacturaindependente.com/colorfont/v1/.
International Search Report & Written Opinion, PCT/US2013/076917, mailed Jul. 9, 2014, 11 pages.
"photofont.com—Use photofonts," Sep. 2, 2012, retrieved from the internet: http://web.archive.org/web/20120902021143/http://photofont.com/photofont/use/web.
European Search Report, 14187549.2, Jul. 30, 2015 7 pages.
Saurabh, Kataria et al., "Font retrieval on a large scale: An experimental study", 2010 17th IEEE International Conference on Image Processing (ICIP 2010); Sep. 26-29, 2010; Hong Kong, China, IEEE, Piscataway, NJ, USA, Sep. 26, 2010, pp. 2177-2180.
European Search Report, 14184499.3, Jul. 13, 2015, 7 pages.
"Flash CS4 Professional ActionScript 2.0", 2007, retrieved on http://help.adobe.com/en_US/AS2LCR/Flash_10.0/help.html?content=00000284.html on Aug. 31, 2015.
European Search Report, 13179728.4, Sep. 10, 2015, 3 pages.
Ma Wei-Ying et al., "Framework for adaptive content delivery in heterogeneous network environments", Jan. 24, 2000, Retrieved from the Internet: http://www.cooltown.hp.com/papers/adcon/MMCN2000.
Doughty, Mike, "Using OpenType® Fonts with Adobe® InDesign®," Jun. 11, 2012 retrieved from the internet: http://webarchive.org/web/20121223032924/http://www.sketchpad.net/opentype-indesign.htm (retrieved Sep. 22, 2014), 2 pages.
Goswami, Gautum, "Quite 'Writly' Said!," One Brick at a Time, Aug. 21, 2006, Retrieved from the internet: :http://gautamg.wordpress.com/2006/08/21/quj.te-writely-said/ (retrieved on Sep. 23, 2013), 3 pages.
International Search Report & Written Opinion, PCT/US2014/010786, mailed Sep. 30, 2014, 9 pages.
Wenzel, Martin, "An Introduction to OpenType Substitution Features," Dec. 26, 2012, Retrieved from the internet: http://web.

(56) References Cited

OTHER PUBLICATIONS archive.org/web/20121226233317/http://ilovetypography.com/OpenType/opentype-features. Html (retrieved on Sep. 18, 2014), 12 pages.
"Saffron Type System", retrieved from the internet Nov. 12, 2014, 7 pages.

* cited by examiner

SUPPORTING COLOR FONTS

CLAIM OF PRIORITY

This application claims priority under 35 USC §119(e) to U.S. Patent Application Ser. No. 61/745,153, filed on Dec. 21, 2012, the entire contents of which are hereby incorporated by reference.

BACKGROUND

This description relates to techniques for allowing computing devices to support color fonts for presentation.

In the ever-expanding connectivity and information sharing capabilities provided by computer networks such as the Internet, various types of web assets such as websites, webpages, etc. have been developed to assist with the transfer of information. Along with the almost explosive development of web assets, the content being presented by the assets has similarly grown. Text, audio, video, etc. is being incorporated into web assets to provide a more efficient and enjoyable viewing experience. For example, different languages, imagery, etc. may be included in web assets to tailor content for characteristics of a viewer such as their geographical location. However, providing such rich content does not come without some constraints. For example, the functionality of computing devices, operating systems, software, etc. may limit a viewer's ability to view and enjoy all of the content types that could be provided.

SUMMARY

The systems and techniques described here relate to determining if an asset presenter (e.g., a web browser, a device, etc.) is capable of supporting fonts that are capable of employing multiple colors. Appropriate action can be taken based upon the determination. For example, if capable of supporting such color fonts, appropriate font information may be provided to the asset presenter for presenting the font (e.g., in an asset such as a webpage, website, etc.). If not supported by the asset presenter, font information may be prepared and provided such that the asset presenter can present the color fonts. By providing the ability to present such richly colored content, viewer experiences may be improved along with their interest in the asset (e.g., webpage, website, etc.) being presented.

In one aspect, a computer-implemented method includes receiving information that requests one or more colored fonts of a web asset for an asset presenter being executed by a computing device. In response to receiving the information, the method include sending color font information to the computing device to allow content of the web asset represented in colored fonts to be presented by the computing device. The color font information is provided by an executable file and a color font file, or, an executable file that includes content of the color font file.

Implementations may include one or more of the following features. The executable file, when executed by the computing device, may adjust a document object model. Adjusting the document object model may include replicating glyphs of the web asset in a node-based structure representation of the document object model. Adjusting the document object model may include assigning one or more colors to the replicated glyphs. The color font file may include a font subset for presenting the content of the web asset. The color font file may include scalable vector graphics. Sending the color font information may include sending a file to the computing device that includes glyph spacing information and is absent glyph marking information. Positioning of the glyph spacing information as presented by the computing device may be adjustable based upon user interaction.

In another aspect, a system includes a computing device that includes a memory configured to store instructions. The computing device also includes a processor to execute the instructions to perform operations that include receiving information that requests one or more colored fonts of a web asset for an asset presenter being executed by a computing device. Operations also include, in response to receiving the information, sending color font information to the computing device to allow content of the web asset represented in colored fonts to be presented by the computing device. The color font information is provided by an executable file and a color font file, or, an executable file that includes content of the color font file.

Implementations may include one or more of the following features. The executable file, when executed by the computing device, may adjust a document object model. Adjusting the document object model may include replicating glyphs of the web asset in a node-based structure representation of the document object model. Adjusting the document object model may include assigning one or more colors to the replicated glyphs. The color font file may include a font subset for presenting the content of the web asset. The color font file may include scalable vector graphics. Sending the color font information may include sending a file to the computing device that includes glyph spacing information and is absent glyph marking information. Positioning of the glyph spacing information as presented by the computing device may be adjustable based upon user interaction.

In another aspect, one or more computer readable media storing instructions that are executable by a processing device, and upon such execution cause the processing device to perform operations that include receiving information that requests one or more colored fonts of a web asset for an asset presenter being executed by a computing device. Operations also include, in response to receiving the information, sending color font information to the computing device to allow content of the web asset represented in colored fonts to be presented by the computing device. The color font information is provided by an executable file and a color font file, or, an executable file that includes content of the color font file.

Implementations may include one or more of the following features. The executable file, when executed by the computing device, may adjust a document object model. Adjusting the document object model may include replicating glyphs of the web asset in a node-based structure representation of the document object model. Adjusting the document object model may include assigning one or more colors to the replicated glyphs. The color font file may include a font subset for presenting the content of the web asset. The color font file may include scalable vector graphics. Sending the color font information may include sending a file to the computing device that includes glyph spacing information and is absent glyph marking information. Positioning of the glyph spacing information as presented by the computing device may be adjustable based upon user interaction.

In another aspect, a computer-implemented method that includes receiving information that indicates whether an asset presenter being executed by a computing device is capable of presenting one or more colored fonts of a web asset. In response to receiving the information, sending color font information to the computing device to allow content of the web asset represented in colored fonts to be presented by the computing device.

Implementations may include one or more of the following features. Sending the font information may include sending an executable file to the computing device. Sending the font information may include sending a color font file to the computing device. The color font file may include scalable vector graphics. Sending the color font information may include sending a file to the computing device that includes glyph spacing information and is absent glyph marking information. Positioning of the glyph spacing information as presented by the computing device may be adjustable based upon user interaction.

In another aspect, a system includes a computing device that includes a memory configured to store instructions. The computing device also includes a processor to execute the instructions to perform operations that include receiving information that indicates whether an asset presenter being executed by a computing device is capable of presenting one or more colored fonts of a web asset. In response to receiving the information, sending color font information to the computing device to allow content of the web asset represented in colored fonts to be presented by the computing device.

Implementations may include one or more of the following features. Sending the font information may include sending an executable file to the computing device. Sending the font information may include sending a color font file to the computing device. The color font file may include scalable vector graphics. Sending the color font information may include sending a file to the computing device that includes glyph spacing information and is absent glyph marking information. Positioning of the glyph spacing information as presented by the computing device may be adjustable based upon user interaction.

In another aspect, one or more computer readable media storing instructions that are executable by a processing device, and upon such execution cause the processing device to perform operations that include receiving information that indicates whether an asset presenter being executed by a computing device is capable of presenting one or more colored fonts of a web asset. In response to receiving the information, sending color font information to the computing device to allow content of the web asset represented in colored fonts to be presented by the computing device.

Implementations may include one or more of the following features. Sending the font information may include sending an executable file to the computing device. Sending the font information may include sending a color font file to the computing device. The color font file may include scalable vector graphics. Sending the color font information may include sending a file to the computing device that includes glyph spacing information and is absent glyph marking information. Positioning of the glyph spacing information as presented by the computing device may be adjustable based upon user interaction.

These and other aspects and features and various combinations of them may be expressed as methods, apparatus, systems, means for performing functions, program products, and in other ways.

Other features and advantages will be apparent from the description and the claims.

DETAILED DESCRIPTION

Figure 1:
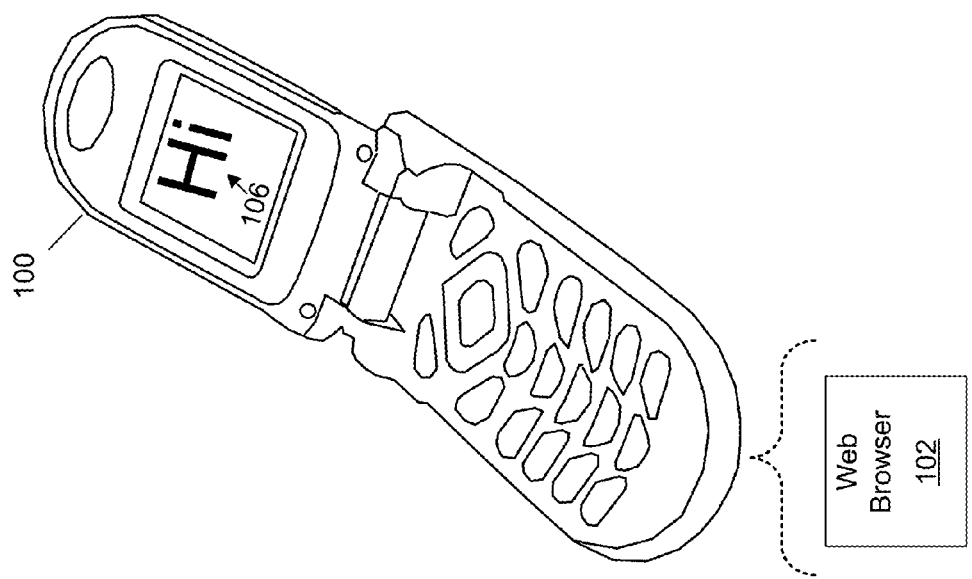
FIG. 1 illustrates a mobile device presenting text in a single color.

Referring to FIG. 1, many types of computing devices are capable of presenting various types of graphical content such as text, images, video, etc. To present text and similar graphics, various types of font families (e.g., Times New Roman, Arial, etc.) may be used that typically include a set of fonts, e.g., regular, italic, bold, bold italic, etc. Each font generally includes a set of individual character shapes called glyphs and the glyphs generally share various design features (e.g., geometry, stroke thickness, serifs, size, etc.) associated with the font. One or more techniques may be utilized for representing such fonts; for example, outline-based representations may be adopted in which lines and curves are used to define the borders of glyphs. Such fonts may be scalable for a variety of sizes (e.g., for rendering by various computing devices) and may be represented in one or more formats. For example, scalable outline fonts may be represented in a format that includes data structures capable of supporting a variety of typographic visual symbols of many languages. Along with the size and shape of the glyphs used by the font to represent a character, a color is also generally applied. For example, relatively dark colors (e.g., black, blue, etc.) are typically implemented for presenting the font characters. However, other colors such as lighter shaded colors (e.g., white, yellow, etc.) may also be implemented (e.g., when a darker background such as a black background is being presented).

As illustrated in the figure, some devices, operating systems, software applications etc. may be capable of presenting font characters and features that employ a single color. However, often such devices, operating systems, applications, etc. are unable to support presenting such characters and features in multiple colors. For example, it may be desired to present an individual font with multiple colors such as one portion of a character in one color (e.g., the horizontal crossbar of the character "T") and another portion of the character (e.g., the vertical post of the character "T") in another color. In another example, different characters may be presented in different colors, for example the font character "A" may be presented in the color red while the font character "B" may be presented in the color blue. In this illustrated example, a cellular telephone 100 is executing an asset presenter (e.g., web browser application 102) to present content transmitted over one or more networks (e.g., the Internet) from a variety of sources. In this situation, the web browser 102 does not support the ability to present font characters in multiple colors. For example, each character of the presented phrase "Hi" 104 may only be presented by the web browser 102 in one color (e.g., the color black) and not in multiple colors. Based upon the browser being executed by a user computing device, the ability to use multiple colors for individual characters may or may not be supported and multi-color content from an author may not be presented as originally prepared. However, by knowing the capabilities of a device, its operating system, executed applications, etc., information may be prepared and provided to the device so it can be capable of properly presenting such multi-color content as originally intended.

Figure 2:
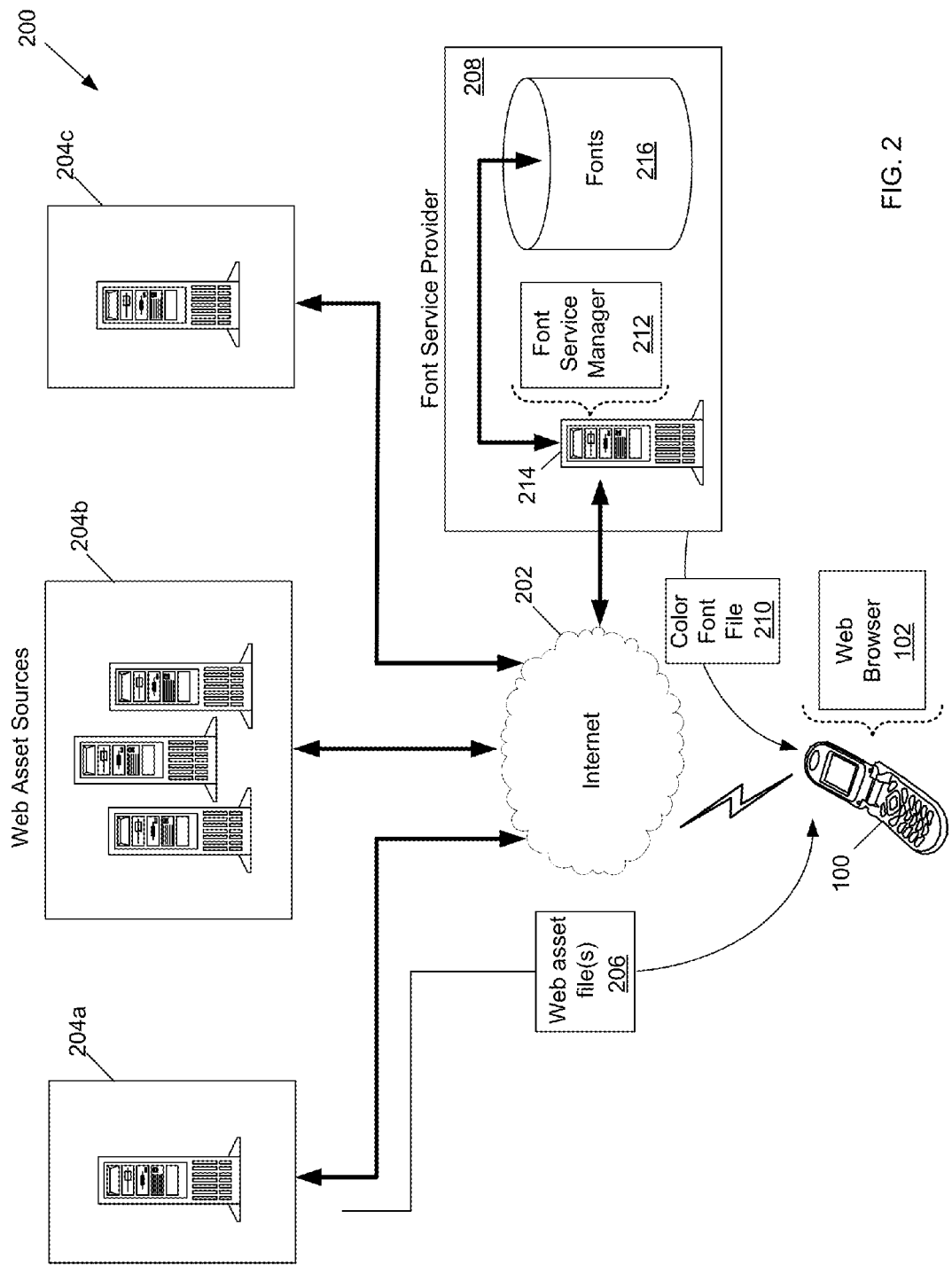
FIG. 2 is a block diagram of an Internet based computer network.

Referring to FIG. 2, a computing environment 200 includes a computing device (e.g., the cellular telephone 100) that a user may interact with (e.g., using a keypad, etc.) to identify a target web asset (e.g., website, webpage, etc.) for being presented by the computing device. For example, the web browser 102 or other type of asset presenter (e.g., a software application) may be executed by the cellular telephone 100 for the user to target one or more webpages. Upon being identified, operations of the web browser 102 may include requesting, via the Internet 202, content from one or more webpage sources 204a,b,c for the target webpage(s). As illustrated, in this particular example, a webpage page is requested from web asset source 204a and a corresponding web asset file or files 206 are sent from the source through the Internet 202 to the cellular telephone 100. In one arrangement, the web asset files 206 include a hypertext markup language (HTML) file that includes instructions for presenting the asset and a cascading style sheet (CSS) file that provides presentation semantics for the asset being provided by the HTML file.

To determine if the web browser 102 is capable of processing and presenting multi-color character fonts, one or more techniques and methodologies may be implemented. For example, operations may be executed at one or more locations for making the determination. In the illustrated example, operations may be executed by the cellular telephone 100 (or other types of user computing devices) and a font service provider 208, which is in communication with the computing device through one or more networks (e.g., the Internet 202). The font service provider 208 may incorporate one or more architectures, layouts, etc. For example, the font service provider 208 may incorporate a relatively large distributions of systems, computing devices (e.g., servers), etc. deployed in one or more locations (e.g., different geographical locations) and can be considered a content delivery network. Once determined if the web browser is capable of supporting multi-color character fonts or not, the font service provider 208 may execute operations to provide appropriate information to the computing device for presenting the multi-color content for either situation (e.g., the web browser supports multi-color fonts or the web browser does not support multi-color fonts). As illustrated in the figure, a color font file 210 represents the multi-color information that is sent from the font service provider 208 to the user device (i.e., the cellular telephone 100). Once the multi-color information (e.g., contained in the color font file 210) is received, the information is used by the user device (e.g., executed by an asset presenter such as a web browser) to present the multi-color character fonts. In the illustrated example, a determination is made whether a web browser supports color fonts, however such a determination may be made for other types of web asset presenters. For example, along with web browsers, a web asset presenter may be considered as one or more applications (referred to as a web-based application) that can access or be accessed over a network such as the Internet, an intranet, etc. Such web-based applications may also be considered as software applications that are hosted over a network and coded in a browser supported programming language (such as JavaScript, combined with a browser-rendered markup language such as HTML, etc.). A web asset presenter may also be one or more applications (e.g., native application) executed on a computing device (or multiple devices) such as a user device (e.g., the cellular telephone 100) that provide a view of a web asset (e.g., a web view). Similar applications executed locally, remotely, or in combination among multiple locations may be considered as a web asset presenter. Similar to making the determination for web asset presenters, such a determination may be made for asset presenters that do not communicate with networks such as the Internet. For example, an asset presenter may be considered as one or more applications locally executed by a computing device that is capable of presenting network based assets such webpages, websites, etc. without being in communication with the Internet.

One or more architectures may be implemented by the font service provider 208 for determining if an asset presenter is capable of presenting color fonts along with other functionality. In the illustrated arrangement, a font service manager 212 is executed by a server 214 located at the font service provider 208. To prepare and provide the color font file 210 (or files) to the user device, the font service manager 212 may access information from one or more sources such as a storage device 216 (e.g., one or more hard drives, CD-ROMs, etc.) located at the font service provider 208. However, the font information provided by the server 214 may also be collected from one or more other sources located internal or external to the font service provider 208. In one arrangement, upon receiving and executing the web asset file(s) 206 (e.g., the HTML file), the web browser 102 may initiate a request to be delivered to the font service provider 208 that asks for a software agent to be sent to the user device (e.g., the cellular telephone 100). Such agents can be considered as a software module that may be executable in a substantially autonomous manner. For example, upon being provided to the user computer device (e.g., the cellular telephone 100), a software agent may operate without considerable user interaction. By operating in a somewhat flexible manner, the software agent can adaptively identify if the web browser 102 being executed by the user device is capable of supporting color fonts such as multiple colors being applied to one or more font characters. In one arrangement, the software agent may be implemented as a file that includes scripting language that is capable of supporting a variety of programming styles (e.g., JavaScript). Once received, the software agent may be executed (e.g., by the web browser 102) to determine if the executed browser 102 is capable of presenting color fonts. To make such a determination, one or more techniques may be implemented. For example, by identifying the browser being executed (e.g., from information such as browser type, version, manufacturer, etc.) the software agent may use one or more predefined rules (e.g., Microsoft Internet Explorer version 10 supports color fonts, Microsoft Internet Explorer version 8 does not support color fonts, etc.) to determine if the web browser is capable of presenting such color fonts such as multi-color characters. Along with a rules-based determination being used by the software agent to determine if a web browser supports color fonts, other techniques and methodology may be implemented. For example, the software agent may poll the asset presenter (e.g., web browser), test the asset presenter, etc. to determine if the asset presenter supports color fonts such as multi-color font characters.

Operations may be executed remotely from the user device to determine if an asset presenter (e.g., executed by the user device) is capable of supporting color fonts such as multi-color font characters. For example, operations may be executed at the font service provider 208 (with or without operations being executed on the user device) for making such determinations. In one arrangement, the font service provider 208 may use information provided by the user device to execute the determinations. For example, software (e.g., a user agent) operating in association with asset presenter (e.g., the web browser 102) may provide information to the font service provider 208. Along with identifying information associated with the asset presenter (e.g., web browser name, type, version, capabilities, etc.), the user agent may also provide other information such as device information (e.g., type of user device, version, capabilities, etc.), other software executed by the device (e.g., operating system, applications, etc.) and other types of information (e.g., protocols being used by the web browser, etc.). From the provided information, the font service provider 208 may determine if the user device (e.g., cellular telephone 100) is capable of supporting color fonts.

Software agents provided to the user device may also provide other type of functionality. For example, a software agent may also gather other information for having a target web asset (that uses color fonts) to be presented by the user computing device. For example, the software agent may identify the particular color-related information from the web asset that may be needed from the font service provider 208 to present the asset. In one arrangement, the software agent may scan the CSS file provided with the web asset file(s) 206 of the web asset to determine such color-related information included in the web asset. The software agent may also review the HTML file provided with the web asset file(s) 206 to identify color-related information such as the particular characters, glyphs, etc. and other types of typographical elements (e.g., ligatures, a single glyph fractions, subscripts, superscripts, etc.) being used by the asset. Other types of information may also be collected for being provided to the font service provider 208. For example, information associated with the user computing device, operating system used by the device, application(s) executed by the device (e.g., the type of web browser being executed by the device), etc. Once identified, this information may be provided to the font service provider 208 for processing and preparing the needed information for delivery to the user computing device (e.g., the cellular telephone 100) for presenting the content of the asset. Along with color-related information, other types of information may be provided to the font service provider 208. For example, the particular fonts, characters, typographical features, etc. included in the content of the web asset may be identified (e.g., by a software agent) and provided. In response to being provided this information, the font service manager 212 may prepare one or more subsets of appropriate font data (along with the color-related information) such that the only font information provided to the user device is the information needed to present the web asset and no additional font information (e.g., font characters not included in the web asset) is transmitted from the font service provider 208 to the user computing device.

Figure 3:
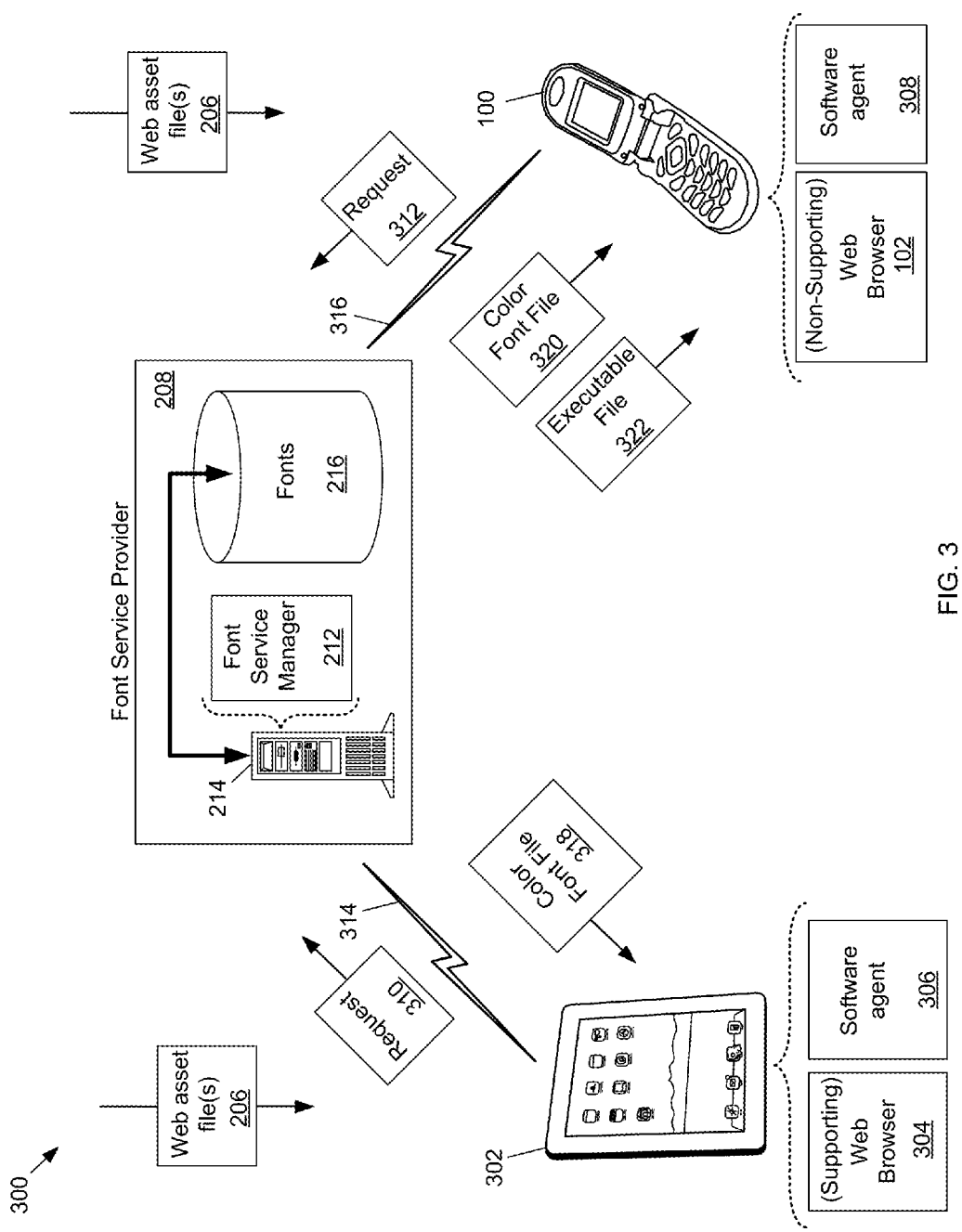
FIG. 3 illustrates a font service provider for distributing font information to computing devices.

Referring to FIG. 3, a diagram 300 graphically illustrates data transfers such that appropriate information (e.g., color font information) is provided to asset presenters (e.g., web browsers) for presenting web assets based upon whether or not the asset presenter supports color fonts. In this illustration, one computing device (i.e., the cellular telephone 100) does not support this capability and another computing device (i.e., a tablet computing device 302) is capable of presenting such color fonts. Both devices respectively execute browsers 102, 304, which in this example, are directed to the same target web asset. From the source of the web asset, the corresponding web asset file(s) 206 are provided to each device 100, 302. Upon receiving the file(s), software agents 306, 308 are respectively provided to the devices (e.g., from the font service provider 208) or are previously residing and are executed (e.g., to determine if each corresponding device is capable of providing support for such color fonts). To initiate the delivery of the software agents 306, 308, one or more techniques may be implemented. For example, once delivered, the web asset file(s) 206 (e.g., an HTML file and a CSS file) may be used (e.g., executed) by the recipient device to initiate a request being sent to the font service provider 208. Receiving the request, a software agent (e.g., a JavaScript file) may be sent as a reply from the font service manager 212 being executed by the server 214 at the font service provider 208. Along with sending the software agent, the font service provider 208 may perform other operations associated with the software agent. For example, at predefined times (e.g., intervals, event triggered times, etc.) the agent may be updated by the font service provider 208 as information is collected. Information regarding which types of browsers is capable of supporting color fonts, incapable of supporting color fonts, etc. may be gathered and included in updated versions of the software agent. The font service manager 212 may execute other operations in some arrangements. For example, the font service manager 212 may determine if a web browser is capable of supporting or not supporting color fonts and other potential features (e.g., scalable font formats such as OpenType fonts). Receiving information from a device (e.g., the type of browser being executed by the device in a request such as request 310), the font service manager 212 may be able to determine if color fonts are supported by the device and execute appropriate operations. For example, information associated with the asset presenter (e.g., web browser 304) and collected by a user agent may be provided in the request (being sent from the device to the font service provider 208). From the provided information and possibly other information (e.g., present at the font service provider 208), the font service manager 212 may determine the color font capabilities of the asset presenter executed by the device and take appropriate action.

The software agents 306, 308 may be capable of performing other operations. For example, operations may be respectively executed by the software agents 306, 308 to collect information regarding color information, typographical features and other content of the web asset being provided by the web asset file(s) 206. In one example, each software agent may read the CSS file included with the web asset file(s) 206 to identify which font information (e.g., color information, classes, etc.) may be used by the asset. The software agent may also read the HTML file included with the web asset file(s) 206 to identify the particular colors, characters, features, etc. that may be used by the web asset. In some arrangements, the software agent may read information of the HTML file from other sources, for example, information from a document object model (DOM), a node-based structure used to organize the information (e.g., a DOM tree), etc. By identifying data such as the colors, characters, etc. used by the web asset, one or more advantageous operations may be executed. For example, if a relatively small number of colors, characters, glyphs, etc. for a particular font are identified as being presented for the web asset, an appropriate font subset that only includes those identified colors, characters, glyphs, typographical features (e.g., OpenType font features) etc. may be provided by the font service provider 208, thereby conserving processing time and memory by not having font information absent from the web asset being sent to the corresponding user device. Incremental subsetting techniques may also be employed. For example, after a subset is produced for the color fonts, characters, typographical features, etc. present in a first page of a web asset, this identified information may not be used for producing subset(s) for subsequent pages (e.g., a second page) of the web asset. By filtering out color fonts, characters, typographical features, etc. already present in a subset, less processing time and memory may be consumed in a redundant manner.

In some arrangements, operations of the software agents 306, 308 may be initiated by one or more conditions being satisfied, one or more events occurring, etc. For example, the software agents may not use the contents of the web asset file(s) 206 until appropriately signaled that one or more events have occurred. In one arrangement, applications such as a text-to-speech application may process the contents of the web asset file(s) 206 prior to being used by the software agents 306, 308. For example, once textual content of the web asset file(s) 206 (e.g., an HTML file) has been read by the text-to-speech application (e.g., for conversion to audible speech), one or more signals may be sent (or other type of signaling technique employed) to notify the software agents 306, 308 that the web asset files(s) 206 may be accessed and used. In some arrangements, operations of the software agent may execute substantially in parallel with operations of other applications that also use the contents of the web asset file(s) 206 (e.g., the software agent and one or more other applications may access content of the web asset file(s) in parallel).

To provide the collected information (e.g., information collected by a user agent, does the browser support color fonts, etc.; what color information, color fonts, etc. are included in the web asset, etc.) one or more techniques or methodologies may be implemented. For example, to provide the collected information to the font service provider 208, each of the user devices 100, 302 may send a corresponding request 310, 312 to the font service provider. In this arrangement, each device is wirelessly connected to the one or more networks (e.g., the Internet) for exchanging information with the font service provider 208, as represented with the respective graphics 314, 316. Upon receiving the requests 310, 312, the font service manager 212 prepares color font information for the devices based upon the information provided in each respective request. For example, dependent upon the capability of the corresponding browser, different types of information may be respectively prepared and sent by the font service provider 208. In the illustrated arrangement, a color font file 318 is prepared and sent to the device 302 executing the web browser 304 that assists the device in supporting color fonts. In general, the information included in the color font file 318 allows the device 302 to express the color font of the web asset as authored. In one arrangement, the color font file 318 may include color font formats that are directly supported by the web browser 304. For example, such a color font format may be implemented in a format that includes data structures capable of supporting a variety of typographic visual symbols of many languages. A format such as a variant of the OpenType format may be capable of defining color fonts along with other types of typographical features for one or more scalable computer fonts. Generally using a file or files of relatively reduced size, such formats may be advantageous.

In some arrangements, the color font file 318 may include other types of color font information. For example, one or more other formats may be implemented for providing color font information. In one arrangement, the asset presenter (e.g., web browser) of the device may be compatible with a family of specifications of an extensible markup language (XML) based file format for two-dimensional vector graphics such as scalable vector graphics (SVG). Formats such as SVG, inline SVG, SVG Tiny (e.g., for mobile devices), etc. can be used for static imagery (e.g., individual images) and dynamic imagery (e.g., interactive, animated imagery, etc.). Similar to SVG, other implementations may also be employed that use layering techniques (e.g., apply one color to a background layer, apply a second color to a foreground layer, etc.) for providing color font information (e.g., in the color font file 318) to the asset presenter (e.g., web browser 304).

Some web browsers or other types of asset presenters are unable to support color fonts formats such as SVG. In such situations, one or more techniques may be implemented to enable color fonts. For example, one or more executable files may be provided to the asset presenter (e.g., a non-supporting web browser) such that when executed each character present in the web asset is replicated into multiple glyphs such that each may be assigned a specific color. For example, one or more JavaScript files may be provided and when executed, the DOM tree associated with a target web asset is altered at run-time such that each character present in the asset is replicated into multiple glyphs and assigned a corresponding color. Two or more of the replicated glyphs may share a common font, or, two or more different fonts may be used by the replicated glyphs. Assigned colors, the executable files may layer the replicated glyphs such that a multi-color character may be presented in one or more fonts (e.g., web fonts). In some arrangements, the executed file or files (e.g. JavaScript files), a software agent, etc. may insert, adjust, etc. data in the DOM tree.

In this example, recognizing that the web browser 102 of the device 100 does not support color fonts (e.g., from the information provided by the request 312), different color font information may be sent to the user device (compared to the color font file 318 sent to the user device 302 capable of supporting such color fonts). One or more techniques may be implemented to provide color font information to non-supporting web browsers for presenting, for example, multi-color font characters. In the illustrated example, based upon the information included in the request 312, multiple files may be sent from the font service provider 208 to the non-supporting browser 102 of user device 100. In particular, a color font file 320 is delivered from the font service provider 208 that includes some color font information needed to present the color font content of the web asset. In some examples, information is only provided for the content included in the web asset to be presented. As such, a subset of information (needed to present the asset) may be provided (e.g., font color information for characters present in the web asset), thereby conserving sources such as memory, processing time, throughput (and/or other transmission characteristics), etc.

In addition to the color font file 320, an executable file 322 may be provided by the font service provider 208. Typically, the executable file 322 (e.g., a JavaScript file) includes logic for producing, processing, etc. color font information. For example, the executable file 322 may include logic for adjusting the DOM tree of the target web asset for replicating characters and assigning colors to the corresponding glyphs. Additionally, the executable file may include logic for layering the replicated glyphs for producing multi-color characters, for example. Similar to the color font files 318, 320, the contents of the executable file 322 may be reduced based upon the subset of material included in the web asset. For example, logic may be absent from the executable file 322 if corresponding characters and colors are not included in the content of the web asset. Further, multiple executable files may be sent from the font service provider 208 to the device rather than a single executable file. For example, multiple files may be used for delivering the logic for providing color font information. In some arrangements subsetted color font information may be delivered in an individual file or concatenated from multiple files into a single file. In some arrangements, the content of files may be combined. For example, by including the content (e.g., SVG data) of the color font file 320 and the executable file 322 (e.g., a JavaScript file), a single file (e.g., an executable file) that contains the content needed by an asset presenter (e.g., the non-supporting web browser 102) may be provided. Along with using the information provided from the font service provider 208 for presenting color fonts (e.g., with asset presenters that support or do not support such features), the information (e.g., provided by one or more font files, executable files, etc.) may be used for other applications. For example, this information may be utilized by an editor, executed locally (e.g., by a user device) or remotely (e.g., at the font service provider or other location), for corresponding applications (e.g., creating content, editing content, managing content, etc.). For example, an editor that allows a user to select various types of characters (e.g., to create different types of presentations, assets, applications, etc.) may utilize the color font information. Similar to providing characters for selection, the editor may also provide colors and various color patterns and palettes for content creation. Along with different types of editors, various types of user interfaces may be implemented. For example, interfaces may be implemented that are directed toward use on a local computer. Similarly, interfaces may be implemented for remotely located computer systems (e.g., cloud-based computer systems and services) and other types of computer and network architectures.

Figure 4:
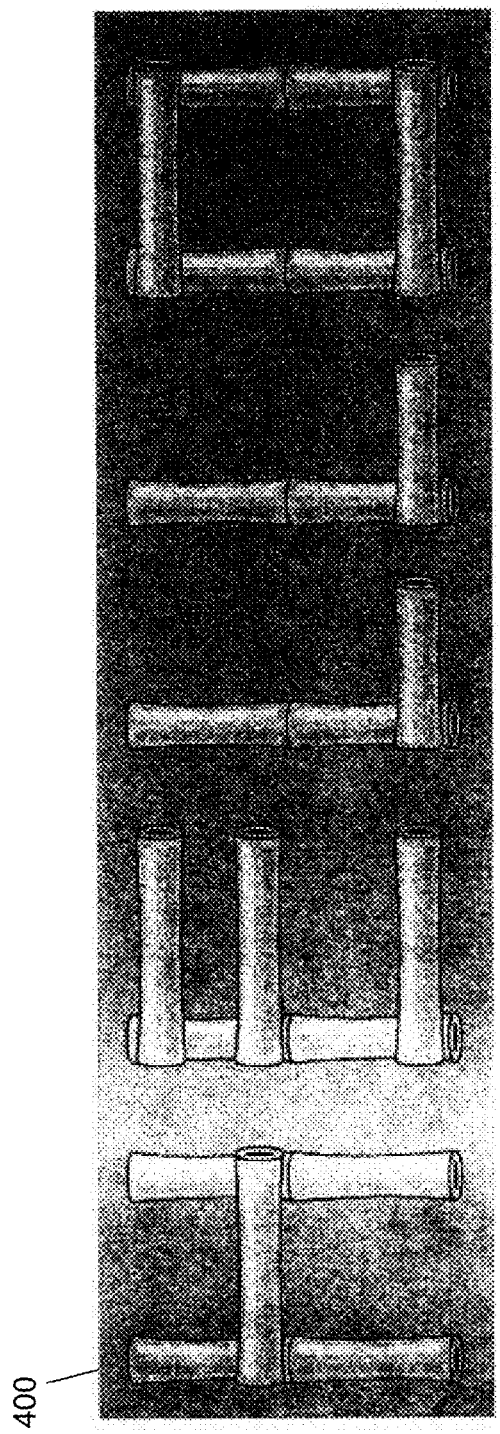
FIG. 4 illustrates presentable content that employs multiple colors.

Referring to FIG. 4, a graphical representation 400 is presented that includes font characters that use multiple colors. In particular, along with shapes being used, the multiple colors applied to each character give the appearance that each letter of the word "HELLO" is made of bamboo sticks.

Along with information for presenting multi-color characters, other types of information may be included in the color font information. For example, similar to solid colors being assigned to portions of a character, gradients of one or more colors may be represented in the color font information. By representing such gradients, a variety of effects (e.g., lighting effects, etc.) may be simulated. For example, by applying color gradients to portions of the letters included in the representation 400, the incident angle of a light source may be simulated (and potentially adjusted). Physical texture may also be represented by in color font information. For example, one or more representations of physical textures (e.g., wood, fur, sand, smooth metal, glass, leather, etc.) may be represented in the information (e.g., the color font file 318 provided to an asset presenter capable of supporting color fonts, the color font file 320 and/or the executable file 322 provided to an asset presenter unable to support color fonts). Similar to solid colors, such gradients, textures, etc. may be represented by vector graphics (e.g., SVG, inline SVG, SVG Tiny, etc.) or other techniques that use geometrical primitives for representing images and allow the images to be scaled without significant degrading of clarity. Textures may be represented along one or more axes, for example, to create texture patterns. A graphical element that represents a texture element may be mirrored along an x-axis and a y-axis to produce a two-dimensional representation of the texture. By mirroring the graphical element along a single axis (e.g., an x-axis), a one-dimensional texture path may be produced that extends along the single axis. Through the use of vector graphics, the texture representation may be adjusted (e.g., scaled up, scaled down, offset, bent, etc.) to provide the visual effect of interest (e.g., have a texture path follow a straight line, curved line, etc.; represent a two-dimensional surface with the texture, etc.).

Similar to producing two-dimensional characters, such color information could also be used for producing three-dimensional characters. For example, color font information representing solid colors, color gradients, textures, etc. may be used to define three-dimensional characters based upon the location of one or more virtual light sources. Along with using the geometry of the virtual light source (or sources), other geometrical locations may be used for defining the shading, tone, etc. of three dimensional characters (or combinations of two and three dimensional characters). For example, the perspective of one or more viewers may be defined and used to determine the colors, gradients, textures, etc. to be applied to portions of the characters. For example, colors, gradients and textures may be applied to provide a certain esoteric visual effect at the perspective of the viewer. Along with static views, use of a virtual light source or light sources, one or more viewing perspectives, etc. may be used for dynamically changing characters. For example, characters that incorporate one or more animations (e.g., the crossbar of a letter "T" spins about an axis defined by the vertical bar of the letter), may use colors, gradients, textures, etc. to present the animated characters from a particular viewing perspective while being illuminated by one or more virtual light sources. Similar to virtual light sources, data representing real light sources may be used for determining colors, gradients, textures, etc. to be applied to portions of characters. For example, data from one or more sensors may be used to determine parameters (e.g., incident angle, location, orientation, etc.), properties (e.g., light intensity, polarization, etc.), etc. of one or more real light sources (e.g., the sun, street lights, surface reflections, etc.) to determine appropriate colors, gradients, textures, etc. for applying to characters. Viewer perspective and other viewing characteristics may also be included in defining the presentable characters.

Figure 5:
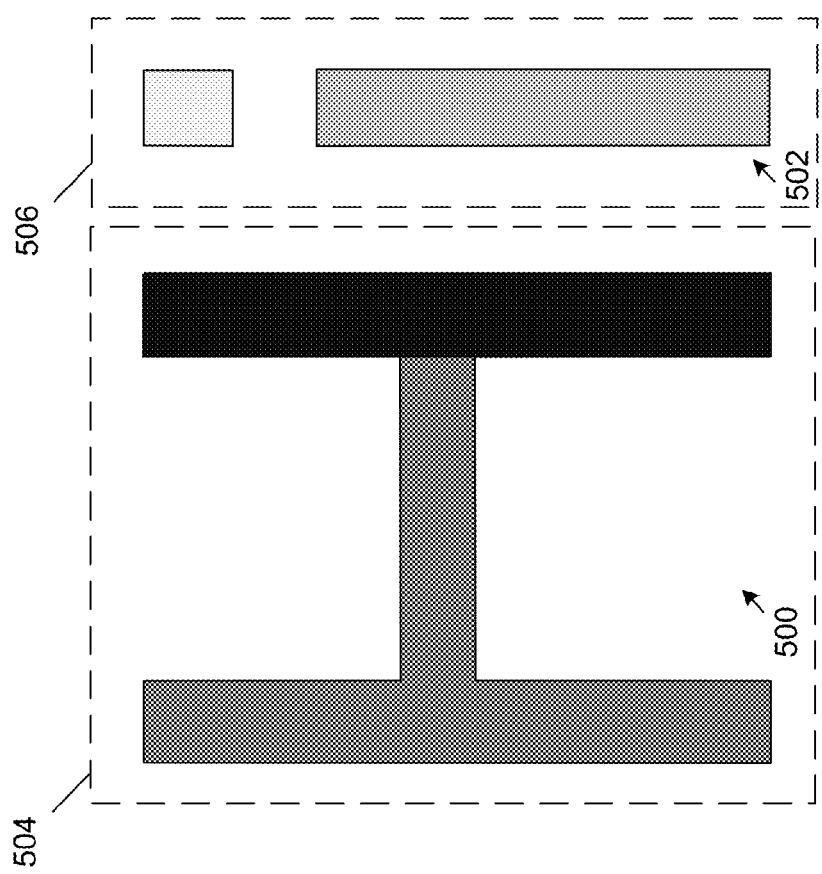
FIG. 5 illustrates glyphs represented by spacing and non-marking information.

Referring to FIG. 5, information may be provided from the font service provider 208 such that the presented text (e.g., represented in a multi-color font) may take advantage of other capabilities of an asset presenter such as a web browser. For example, along with presenting text (e.g., in a webpage), the web browser may be capable of interacting with the text to allow a user to select a portion of the text (e.g., highlight the text through pointing device operations), copy and paste the text (e.g., into another executed application), search the content of the text (e.g., for user-provided search terms), etc. In some instances, such as when the web browser is not capable of supporting color fonts, additional information may be provided by the font service provider 208 to allow for such interactions along with assisting with color font support to present the text. In one example technique, additional data being provided may represent spatial information associated with the font glyphs but not include any additional data for visual information (e.g., character outlines or fill). As such, glyph spacing information may be provided but glyph marking information may be absent. Regardless of whether color fonts are supported or not, the web browser is able to recognize and use this spatial information. For example, the spatial information may assist the web browser with positioning a cursor between the text characters. Made aware of the spatial boundaries of the character, the web browser can allow the text to be searched, portions selected, copied (for pasting in other applications), etc. regardless of whether color fonts are supported by the browser.

One or more techniques may be employed to provide such an empty or invisible font that provides spacing information but is absent additional visual information. For example, such invisible font information may be included in one or more files provided by the font service provider 208. With reference to FIG. 3, along with providing the color font file 320 and the executable file 322 (for use with the web browser 102) the font service provider 208 may also provide a file that includes such invisible font information. For the situation in which the web browser supports color fonts (e.g., web browser 304), a similar file that includes invisible font information may be sent along with a file with color font information (e.g., color font file 318) from the font service provider 208. Other combinations of files may be employed for providing the invisible font information. For example, rather than being sent in a separate file, the invisible font information may be combined with the color font information and sent in a single file (such as the color font file 320). The invisible font information may also be sent from other sources. For example, such invisible font information may be included in the web asset file(s) (e.g., included in the HTML file defining a webpage). In an HTML file, a node may be defined for each word (to be displayed) for instructing that the word be presented in such an invisible font.

Once provided the color font information (e.g., SVG data in the color font file 320) and the invisible font information (e.g., in a separate file from the font service provider 208), the web browser can overprint the invisible font with a color font. As such, the web browser can be assisted in presenting a color font and the web browser is also capable of allowing text to be searched, selected, copied (for pasting into another application), etc. by using the invisible font data. As illustrated in the figure, two characters 500, 502 are presented that employ a font that uses multiple colors (represented in shades of gray) for each character. Additionally, an invisible font for each character (represented by hash-lined boxes 504, 506) provides spatial information such as for positioning a cursor on either side or between the characters.

To assist with allowing the spatial information provided by the invisible font to be utilized, the layering position of the color font and the invisible font may be adjusted. For example, the invisible font may be initially presented and overprinted by the color font. To assist with the selection of the characters, the layer position of the invisible font and the color font may be reversed such that the invisible font lies over the color font. Once the positions have changed, selection of one or more characters may be easier for the user (e.g., operating a pointing device). To initiate the reversing of the positions, one or more techniques may be implemented. For example, based upon a pointing device activity being detected (e.g., the user left-clicks on a mouse), the positions of the invisible font and the color font may reverse. Once reversed, the user can then select the desired character(s) for other operations (e.g., copying, cutting, pasting, etc.).

Figure 6A:
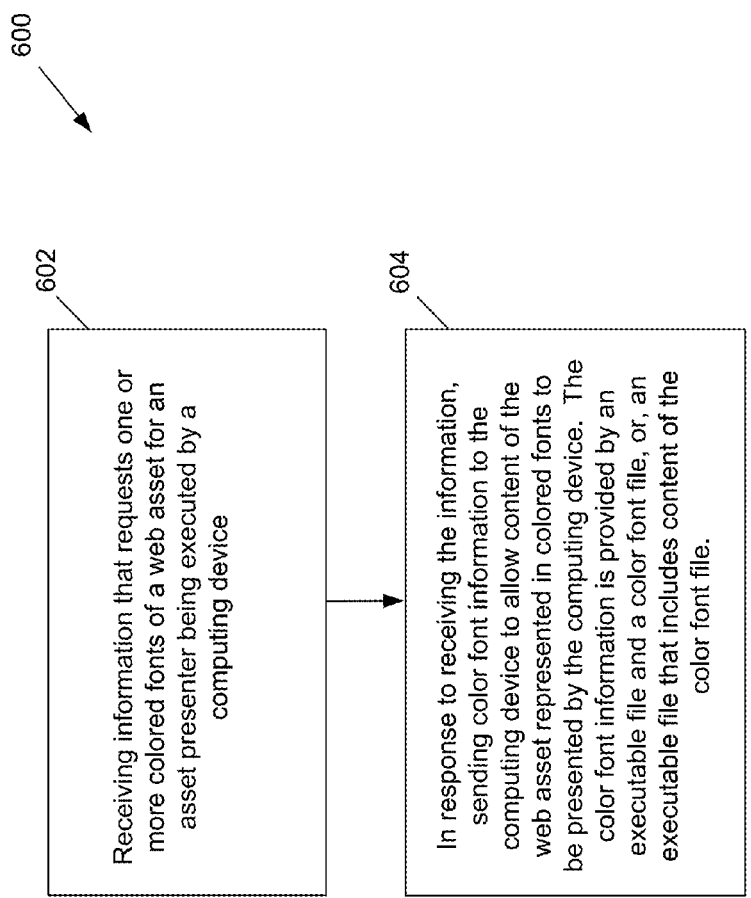
FIGS. 6a and b is an example flow chart of operations of a font service manager.

Referring to FIG. 6a a flowchart 600 represents operations of a font service manager (e.g., the font service manager 212 shown in FIG. 2). Operations of the font service manager are typically executed by a single computing device (e.g., the server 214 also shown in FIG. 3); however, operations of the font service manager may be executed by multiple computing devices. Along with being executed at a single site (e.g., the font service provider 208 shown in FIG. 3), operation execution may be distributed among two or more locations.

Operations of the font service manager may include receiving 602 receiving information that requests one or more colored fonts of a web asset for an asset presenter (e.g., a web browser) being executed by a computing device. In some arrangements the received information may include information about the computing device (e.g., indicate whether the asset presenter being executed by the computing device is capable of presenting the one or more colored fonts of the web asset. For example, a request may be sent from the computing device to the font service provider (where the font service manager is executed) that contains information indicative of whether a web browser executed by the device supports color fonts (e.g., information that identifies web browser, the computing device, etc.). In some arrangements, the request may be absent information indicative of whether the asset presenter is capable (or not) of supporting colored fonts. Operations may also include, in response to receiving the information, sending 604 color font information to the computing device to allow content (e.g., characters, etc.) of the web asset represented in colored fonts to be presented by the computing device. The color font information is provided by an executable file and a color font file, or, an executable file that includes content of the color font file. For example, a color font file may be sent by the font service provider that includes inline SVG information along with an executable file (e.g., a JavaScript file) for producing color font characters. In some arrangements, the contents of these two files may be combined. For example, an executable file (e.g., a JavaScript file) may be provided that also includes the content of the color font file (e.g., inline SVG information) so that the color font characters may be produced for presentation from a single file. Other file combinations and file content combinations may be realized. For example, subsets of color font information may be produced and packaged prior to sending the information to the computing device.

Figure 6B:
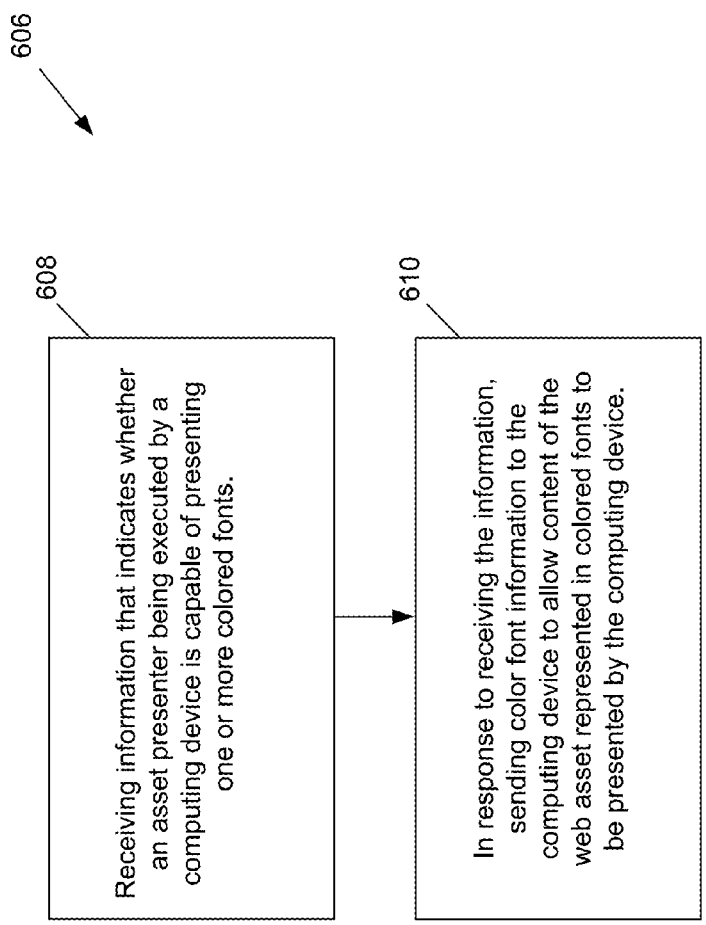

Referring to FIG. 6b a flowchart 606 represents other potential operations of a font service manager (e.g., the font service manager 212 shown in FIG. 2). As mentioned above, operations of the font service manager are typically executed by a single computing device (e.g., the server 214 also shown in FIG. 3); however, operations of the font service manager may be executed by multiple computing devices. Along with being executed at a single site (e.g., the font service provider 208 shown in FIG. 3), operation execution may be distributed among two or more locations.

Operations of the font service manager may include receiving 608 information that indicates whether an asset presenter (e.g., a web browser) being executed by a computing device is capable of presenting one or more colored fonts. For example, a request may be sent from the computing device to the font service provider (where the font service manager is executed) that contains information indicative of whether a web browser executed by the device supports color fonts (e.g., information that identifies web browser, the computing device, etc.). Operations may also include, in response to receiving the information, sending 610 color font information to the computing device to allow content (e.g., characters, etc.) of the web asset represented in colored fonts to be presented by the computing device. For example, a color font file may be sent by the font service provider that includes inline SVG information, an executable file (e.g., a JavaScript file) and/or other information for producing color font characters. Other operations may also subset the color font information prior to sending the information to the computing device.

Figure 7:
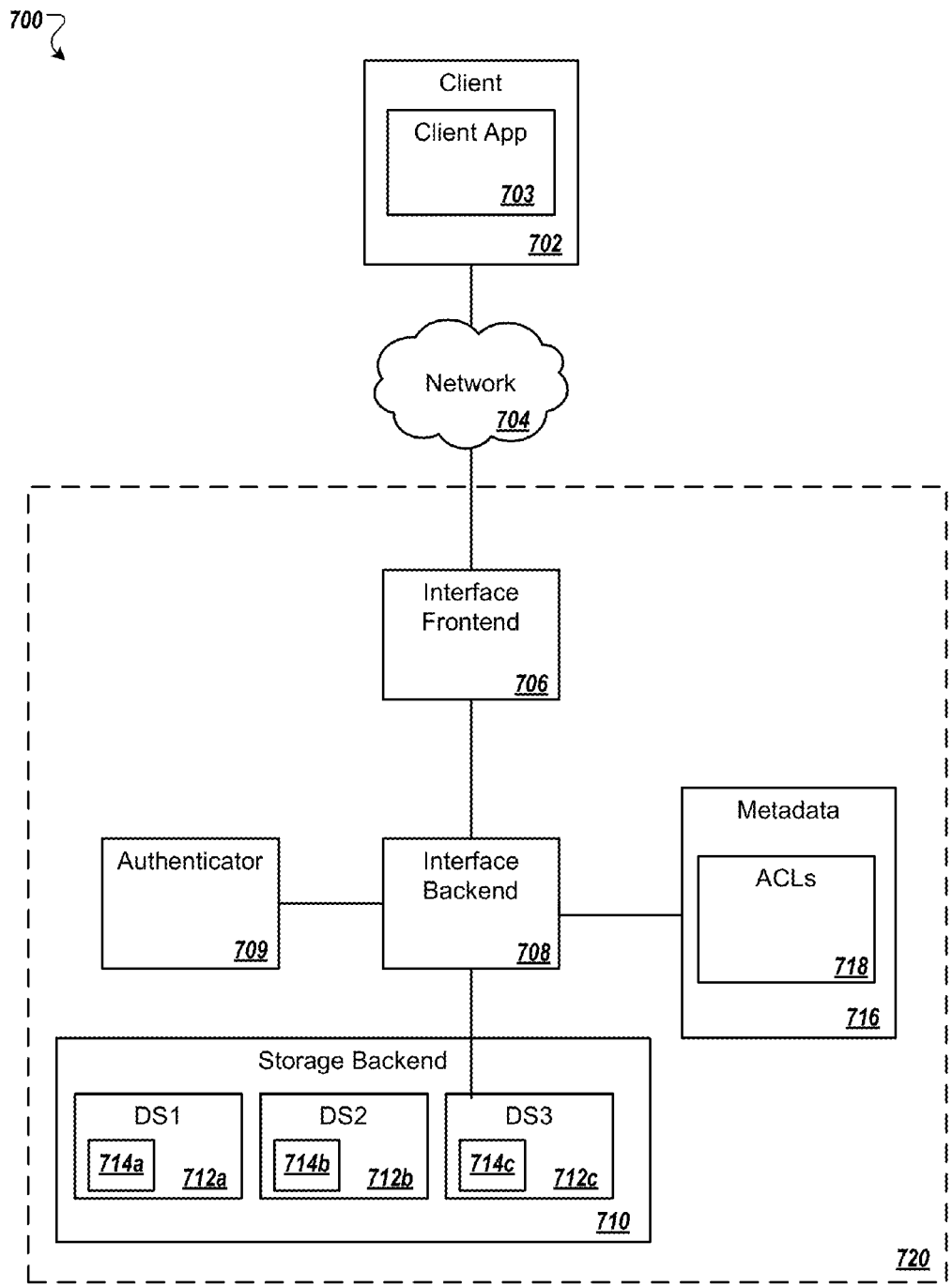
FIG. 7 is a block diagram showing an example of a system for providing hosted storage and accessing the hosted storage from a client device.

FIG. 7 is a block diagram showing an example of a system 700 for providing hosted storage and accessing the hosted storage from a client device 702. In some implementations, a hosted storage service 720 may provide access to stored data (e.g., font information) by applications (e.g., web browsers) running on computing devices operating separately from one another, provide offsite data backup and restore functionality, provide data storage to a computing device with limited storage capabilities, and/or provide storage functionality not implemented on a computing device.

The system 700 may provide scalable stores for storing data resources. The client device 702 may upload data resources to the hosted storage service 720 and control access to the uploaded data resources. Access control may include a range of sharing levels (e.g., private, shared with one or more individuals, shared with one or more groups, public, etc.). Data stored in hosted storage service 720 can be secured from unauthorized access. The hosted storage service 720 can use a simple and consistent application programming interface, or API, which can allow arbitrary quantities of structured or unstructured data to be kept private or shared between individuals, organizations, or with the world at large. The client device 702 may access, retrieve, be provided, store, etc. data in the hosted storage service 720 for any number of a variety of reasons. For example, data may be stored for business reasons (e.g., provide identification information to attain access clearance for font data at the hosted storage service 720), or for use in data processing by other services.

Figure 8:
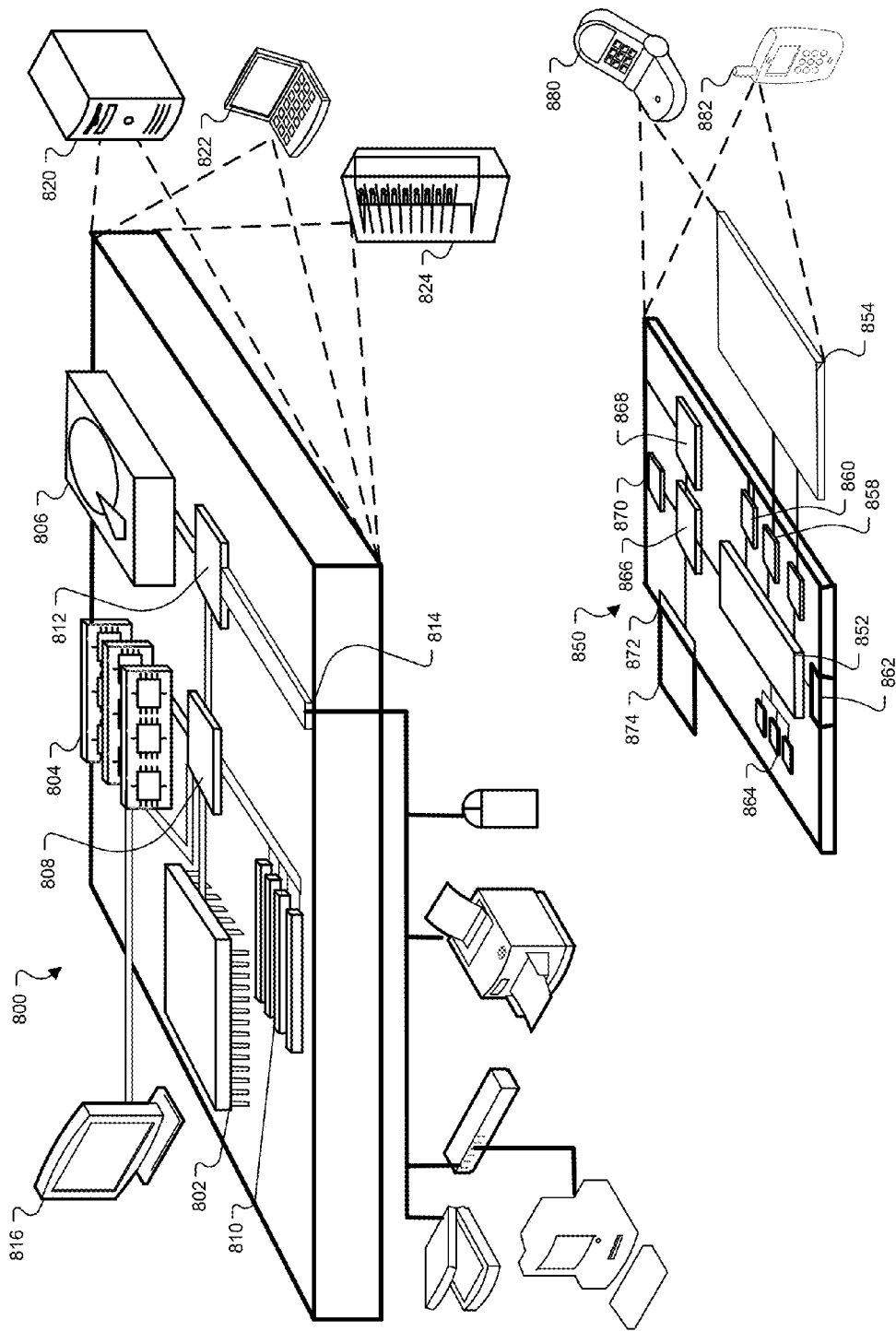
FIG. 8 illustrates an example of a computing device and a mobile computing device that can be used to implement the techniques described here.

The client device 702 may be implemented using a computing device, such as the computing device 800 or the mobile device 850 described with respect to FIG. 8. The client device 702 may communicate with the hosted storage service 720 via a network 704, such as the Internet. The client device 702 may communicate across the network using communication protocols such as, for example, one or more of Transmission Control Protocol/Internet Protocol (TCP/IP), Hypertext Transfer Protocol (HTTP), Secure Shell Remote Protocol (SSH), or Application Program Interfaces (API). While only a single client device 702 is shown, there may be multiple client devices communicating across the network 704 with the hosted storage service 720 and/or other services and devices.

The hosted storage service 720 may be implemented such that client applications executing on client device 702, such as a client application 703, may store, retrieve, or otherwise manipulate data resources in the hosted storage service 720. The hosted storage service 720 may be implemented by one or more server devices, which may be implemented using a computing device, such as the computing device 800 or mobile device 850 described with respect to FIG. 8. For example, the hosted storage service 720 may be implemented by multiple server devices operating in the same, or different, data centers.

The hosted storage service 720 generally includes an interface frontend 706, an interface backend 708, a storage backend 710, and metadata 716 for resources stored in the storage backend 710. The hosted storage service 720 may also include an authenticator 709 to verify that a user requesting one or more fonts should be provided access to the fonts (e.g., based on a service subscription, rental period, etc.).

In general, the interface frontend 706 may receive requests from and send responses to the client device 702. For instance, the hosted storage service 720 may be implemented as a Web Service with a corresponding set of Web Service Application Programming Interfaces (APIs). The Web Service APIs may be implemented, for example, as a Representational State Transfer (REST)-based HTTP interface or a Simple Object Access Protocol (SOAP)-based interface. Interface frontend 706 may receive messages from the client 702 and parse the requests into a format usable by the hosted storage service 720, such as a remote procedure call (RPC) to an interface backend 708. The interface frontend 706 may write responses generated by the hosted storage service 720 for transmission to the client 702. In some implementations, multiple interface frontends 706 may be implemented, for example to support multiple access protocols.

The interface frontend 706 may include a graphical front end, for example to display on a web browser for data access. The interface frontend 706 may include a sub-system to enable managed uploads and downloads of large files (e.g., for functionality such as pause, resume, and recover from time-out). The interface frontend 706 may monitor load information and update logs, for example to track and protect against denial of service (DOS) attacks.

As described above, the Web Service API may be a REST-based HTTP interface. In a REST-based interface, a data resource is accessed as a resource, uniquely named using a uniform resource identifier (URI), and the client application 703 and service 720 exchange representations of resource state using a defined set of operations. For example, requested actions may be represented as verbs, such as by HTTP GET, PUT, POST, HEAD, and DELETE verbs. The GET verb may be used to retrieve a resource, while the HEAD verb may be used to retrieve information about a resource without retrieving the resource itself. The DELETE verb may be used to delete a resource from the hosted storage service 720. The PUT and POST verbs may be used to upload a resource to the service 720. PUT requests may come from the client 702 and contain authentication and authorization credentials and resource metadata in a header, such as an HTTP header. POST requests may be received when a client 702 wants to upload from a web browser form. The form POST upload protocol for the hosted storage service 720 may involve multiple form fields to provide authentication, authorization, and resource metadata. More generally, any of the API requests may include credentials for authentication and authorization, for example in a header of the request. An authorization header may be included in the REST requests, which may include an access key to identify the entity sending the request.

Alternatively, or additionally, a user may be authenticated based on credentials stored in a browser cookie, which may be appended to the API requests. If no valid cookie is present, a redirect to an authentication frontend may be generated, and the authentication frontend may be used to generate the browser cookie. The authentication frontend may be used by systems and services in addition to the hosted storage service 720 (e.g., if the organization operating the hosted storage service 720 also operates other web services such as email service). A user may also or alternatively be authenticated based on authentication credentials from an external credentialing service or an external service that includes credentialing functionality. User or group identifier information may be calculated from the external service's credential information. Requests sent by the client 702 to the interface frontend 706 may be translated and forwarded to the external service for authentication.

In general, resources stored in the hosted storage service 720 may be referenced by resource identifiers. The hosted storage service 720 may define namespaces to which a valid resource identifier must conform. For example, the namespace may require that resource identifiers be a sequence of Unicode characters whose UTF-8 encoding is at most 1024 bytes long. As another example, the namespace may require that resource identifiers be globally unique identifiers (GUIDs), which may be 128-bit integers.

Resources (e.g., objects such as font data) may be stored in hosted storage service 720 in buckets. In some examples, each bucket is uniquely named in the hosted storage service 720, each data resource is uniquely named in a bucket, and every bucket and data resource combination is unique. Data resources may be uniquely identified by a URI that includes the bucket name and the resource name, and identifies the hosted storage service 720.

The interface backend 708 along with the authenticator 709 may handle request authentication and authorization, may manage data and metadata, and may track activity such as for billing. As one example, the interface backend 608 may query the authenticator 709 when a request for one or more fonts is received. The interface backend 708 may also provide additional or alternative functionality. For example, the interface backend 708 may provide functionality for independent frontend/backend scaling for resource utilization and responsiveness under localized heavy loads. Data management may be encapsulated in the interface backend 708 while communication serving may be encapsulated in the interface frontend 706. The interface backend 708 may isolate certain security mechanisms from the client-facing interface frontend 706.

The interface backend 708 may expose an interface usable by both the interface frontend 706 and other systems. In some examples, some features of the interface backend 708 are accessible only by an interface frontend (not shown) used by the owners of the hosted storage service 720 (internal users). Such features may include those needed for administrative tasks (e.g., resolving a resource reference to a low level disk address). The interface backend 708 may handle request authentication (e.g., ensuring a user's credentials are valid) and authorization (e.g., verifying that a requested operation is permitted). The interface backend may also provide encryption and decryption services to prevent unauthorized access to data, even by internal users.

The interface backend 708 may manage metadata 716 associated with data resources, for example in a MySQL database or BigTable. User-specified names labeling the buckets can be completely defined within the metadata 716, and resource metadata 716 can map a resource name to one or more datastores 712 storing the resource. The metadata 716 can also contain bucket and resource creation times, resource sizes, hashes, and access control lists 718 (ACL 718) for both buckets and resources. The interface backend 708 can log activity and track storage consumption to support accounting for billing and chargebacks. In some examples, this includes quota monitoring in each dimension in which customers are charged (e.g., reads, writes, network transfers, total storage in use).

The ACLs 718 may generally define who is authorized to perform actions on corresponding buckets or resources, and the nature of the permitted actions. The ACLs 718 may be an unordered list of {scope, role} pairs, plus Boolean flags. The scope may define a user or group of users and the role may define the access permissions for the user or group. In some examples, the union of all {scope, role} pairs may define access rights. In some examples, more specific {scope, role} pairs override more general ones.

The storage backend 710 may contain multiple datastores 712a-712c. Although three datastores 712 are shown, more or fewer are possible. Each of the datastores 712a-712c may store data resources 714a-714c in a particular format. For example, data store 712a may store a data resource 714a as a Binary Large Object (BLOB), data store 712b may store a data resource 714b in a distributed file system (e.g., Network File System), and data store 712c may store a data resource 714c in a database (e.g., MySQL).

FIG. 8 shows an example of example computer device 800 and example mobile computer device 850, which can be used to implement the techniques described herein. For example, a portion or all of the operations of the font service manager 212 (shown in FIG. 2) may be executed by the computer device 800 and/or the mobile computer device 850. Computing device 800 is intended to represent various forms of digital computers, including, e.g., laptops, desktops, workstations, personal digital assistants, servers, blade servers, mainframes, and other appropriate computers. Computing device 850 is intended to represent various forms of mobile devices, including, e.g., personal digital assistants, tablet computing devices, cellular telephones, smartphones, and other similar computing devices. The components shown here, their connections and relationships, and their functions, are meant to be examples only, and are not meant to limit implementations of the techniques described and/or claimed in this document.

Computing device 800 includes processor 802, memory 804, storage device 806, high-speed interface 808 connecting to memory 804 and high-speed expansion ports 810, and low speed interface 812 connecting to low speed bus 814 and storage device 806. Each of components 802, 804, 806, 808, 810, and 812, are interconnected using various busses, and can be mounted on a common motherboard or in other manners as appropriate. Processor 802 can process instructions for execution within computing device 800, including instructions stored in memory 804 or on storage device 806 to display graphical data for a GUI on an external input/output device, including, e.g., display 816 coupled to high speed interface 808. In other implementations, multiple processors and/or multiple buses can be used, as appropriate, along with multiple memories and types of memory. Also, multiple computing devices 800 can be connected, with each device providing portions of the necessary operations (e.g., as a server bank, a group of blade servers, or a multiprocessor system).

Memory 804 stores data within computing device 800. In one implementation, memory 804 is a volatile memory unit or units. In another implementation, memory 804 is a non-volatile memory unit or units. Memory 804 also can be another form of computer-readable medium, including, e.g., a magnetic or optical disk.

Storage device 806 is capable of providing mass storage for computing device 800. In one implementation, storage device 806 can be or contain a computer-readable medium, including, e.g., a floppy disk device, a hard disk device, an optical disk device, or a tape device, a flash memory or other similar solid state memory device, or an array of devices, including devices in a storage area network or other configurations. A computer program product can be tangibly embodied in a data carrier. The computer program product also can contain instructions that, when executed, perform one or more methods, including, e.g., those described above. The data carrier is a computer- or machine-readable medium, including, e.g., memory 804, storage device 806, memory on processor 802, and the like.

High-speed controller 808 manages bandwidth-intensive operations for computing device 800, while low speed controller 812 manages lower bandwidth-intensive operations. Such allocation of functions is an example only. In one implementation, high-speed controller 808 is coupled to memory 804, display 816 (e.g., through a graphics processor or accelerator), and to high-speed expansion ports 810, which can accept various expansion cards (not shown). In the implementation, low-speed controller 812 is coupled to storage device 806 and low-speed expansion port 814. The low-speed expansion port, which can include various communication ports (e.g., USB, Bluetooth®, Ethernet, wireless Ethernet), can be coupled to one or more input/output devices, including, e.g., a keyboard, a pointing device, a scanner, or a networking device including, e.g., a switch or router, e.g., through a network adapter.

Computing device 800 can be implemented in a number of different forms, as shown in the figure. For example, it can be implemented as standard server 820, or multiple times in a group of such servers. It also can be implemented as part of rack server system 824. In addition or as an alternative, it can be implemented in a personal computer including, e.g., laptop computer 822. In some examples, components from computing device 800 can be combined with other components in a mobile device (not shown), including, e.g., device 850. Each of such devices can contain one or more of computing device 800, 850, and an entire system can be made up of multiple computing devices 800, 850 communicating with each other.

Computing device 850 includes processor 852, memory 864, an input/output device including, e.g., display 854, communication interface 866, and transceiver 868, among other components. Device 850 also can be provided with a storage device, including, e.g., a microdrive or other device, to provide additional storage. Each of components 850, 852, 864, 854, 866, and 868, are interconnected using various buses, and several of the components can be mounted on a common motherboard or in other manners as appropriate.

Processor 852 can execute instructions within computing device 850, including instructions stored in memory 864. The processor can be implemented as a chipset of chips that include separate and multiple analog and digital processors. The processor can provide, for example, for coordination of the other components of device 850, including, e.g., control of user interfaces, applications run by device 850, and wireless communication by device 850.

Processor 852 can communicate with a user through control interface 858 and display interface 856 coupled to display 854. Display 854 can be, for example, a TFT LCD (Thin-Film-Transistor Liquid Crystal Display) or an OLED (Organic Light Emitting Diode) display, or other appropriate display technology. Display interface 856 can comprise appropriate circuitry for driving display 854 to present graphical and other data to a user. Control interface 858 can receive commands from a user and convert them for submission to processor 852. In addition, external interface 862 can communicate with processor 842, so as to enable near area communication of device 850 with other devices. External interface 862 can provide, for example, for wired communication in some implementations, or for wireless communication in other implementations, and multiple interfaces also can be used.

Memory 864 stores data within computing device 850. Memory 864 can be implemented as one or more of a computer-readable medium or media, a volatile memory unit or units, or a non-volatile memory unit or units. Expansion memory 874 also can be provided and connected to device 850 through expansion interface 872, which can include, for example, a SIMM (Single In Line Memory Module) card interface. Such expansion memory 874 can provide extra storage space for device 850, or also can store applications or other data for device 850. Specifically, expansion memory 874 can include instructions to carry out or supplement the processes described above, and can include secure data also. Thus, for example, expansion memory 874 can be provided as a security module for device 850, and can be programmed with instructions that permit secure use of device 850. In addition, secure applications can be provided through the SIMM cards, along with additional data, including, e.g., placing identifying data on the SIMM card in a non-hackable manner.

The memory can include, for example, flash memory and/or NVRAM memory, as discussed below. In one implementation, a computer program product is tangibly embodied in a data carrier. The computer program product contains instructions that, when executed, perform one or more methods, including, e.g., those described above. The data carrier is a computer- or machine-readable medium, including, e.g., memory 864, expansion memory 874, and/or memory on processor 852, which can be received, for example, over transceiver 868 or external interface 862.

Device 850 can communicate wirelessly through communication interface 866, which can include digital signal processing circuitry where necessary. Communication interface 866 can provide for communications under various modes or protocols, including, e.g., GSM voice calls, SMS, EMS, or MMS messaging, CDMA, TDMA, PDC, WCDMA, CDMA2000, or GPRS, among others. Such communication can occur, for example, through radio-frequency transceiver 868. In addition, short-range communication can occur, including, e.g., using a Bluetooth®, WiFi, or other such transceiver (not shown). In addition, GPS (Global Positioning System) receiver module 870 can provide additional navigation- and location-related wireless data to device 850, which can be used as appropriate by applications running on device 850. Sensors and modules such as cameras, microphones, compasses, accelerators (for orientation sensing), etc. maybe included in the device.

Device 850 also can communicate audibly using audio codec 860, which can receive spoken data from a user and convert it to usable digital data. Audio codec 860 can likewise generate audible sound for a user, including, e.g., through a speaker, e.g., in a handset of device 850. Such sound can include sound from voice telephone calls, can include recorded sound (e.g., voice messages, music files, and the like) and also can include sound generated by applications operating on device 850.

Computing device 850 can be implemented in a number of different forms, as shown in the figure. For example, it can be implemented as cellular telephone 880. It also can be implemented as part of smartphone 882, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to a computer program product, apparatus and/or device (e.g., magnetic discs, optical disks, memory, Programmable Logic Devices (PLDs)) used to provide machine instructions and/or data to a programmable processor, including a machine-readable medium that receives machine instructions.

To provide for interaction with a user, the systems and techniques described here can be implemented on a computer having a display device (e.g., a CRT (cathode ray tube) or LCD (liquid crystal display) monitor) for displaying data to the user and a keyboard and a pointing device (e.g., a mouse or a trackball) by which the user can provide input to the computer. Other kinds of devices can be used to provide for interaction with a user as well; for example, feedback provided to the user can be a form of sensory feedback (e.g., visual feedback, auditory feedback, or tactile feedback); and input from the user can be received in a form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a user interface or a Web browser through which a user can interact with an implementation of the systems and techniques described here), or a combination of such back end, middleware, or front end components. The components of the system can be interconnected by a form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the engines described herein can be separated, combined or incorporated into a single or combined engine. The engines depicted in the figures are not intended to limit the systems described here to the software architectures shown in the figures.

A number of embodiments have been described. Nevertheless, it will be understood that various modifications can be made without departing from the spirit and scope of the processes and techniques described herein. In addition, the logic flows depicted in the figures do not require the particular order shown, or sequential order, to achieve desirable results. In addition, other steps can be provided, or steps can be eliminated, from the described flows, and other components can be added to, or removed from, the described systems. Accordingly, other embodiments are within the scope of the following claims.

What is claimed is:

1. A computer-implemented method comprising:
   receiving information that requests one or more colored fonts of a web asset for an asset presenter being executed by a computing device; and
   in response to receiving the information, sending color font information to the computing device to allow content of the web asset represented in colored fonts to be presented by the computing device, wherein the color font information is provided by an executable file and a color font file, or, an executable file that includes content of the color font file, sending the color font information includes sending glyph spacing information for layering with the color font information, the glyph spacing information being absent visual information.

2. The computer-implemented method of claim 1, wherein the executable file, when executed by the computing device, adjusts a document object model.

3. The computer-implemented method of claim 2, wherein adjusting the document object model includes replicating glyphs of the web asset in a node-based structure representation of the document object model.

4. The computer-implemented method of claim 3, wherein adjusting the document object model includes assigning one or more colors to the replicated glyphs.

5. The computer-implemented method of claim 1, wherein the color font file includes a font subset for presenting the content of the web asset.

6. The computer-implemented method of claim 1, wherein the color font file includes scalable vector graphics.

7. The computer-implemented method of claim 1, wherein positioning of the glyph spacing information as presented by the computing device is adjustable based upon user interaction.

8. A system comprising:
   a computing device comprising:
      a memory configured to store instructions; and
      a processor to execute the instructions to perform operations comprising:
         receiving information that requests one or more colored fonts of a web asset for an asset presenter being executed by a computing device; and
         in response to receiving the information, sending color font information to the computing device to allow content of the web asset represented in colored fonts to be presented by the computing device, wherein the color font information is provided by an executable file and a color font file, or, an executable file that includes content of the color font file, sending the color font information includes sending glyph spacing information for layering with the color font information, the glyph spacing information being absent visual information.

9. The system of claim 8, wherein the executable file, when executed by the computing device, adjusts a document object model.

10. The system of claim 9, wherein adjusting the document object model includes replicating glyphs of the web asset in a node-based structure representation of the document object model.

11. The system of claim 10, wherein adjusting the document object model includes assigning one or more colors to the replicated glyphs.

12. The system of claim 8, wherein the color font file includes a font subset for presenting the content of the web asset.

13. The system of claim 8, wherein the color font file includes scalable vector graphics.

14. The system of claim 8, wherein positioning of the glyph spacing information as presented by the computing device is adjustable based upon user interaction.

15. One or more non-transitory computer readable media storing instructions that are executable by a processing device, and upon such execution cause the processing device to perform operations comprising:
receiving information that requests one or more colored fonts of a web asset for an asset presenter being executed by a computing device; and
in response to receiving the information, sending color font information to the computing device to allow content of the web asset represented in colored fonts to be presented by the computing device, wherein the color font information is provided by an executable file and a color font file, or, an executable file that includes content of the color font file, sending the color font information includes sending glyph spacing information for layering with the color font information, the glyph spacing information being absent visual information.

16. The non-transitory computer readable media of claim 15, wherein the executable file, when executed by the computing device, adjusts a document object model.

17. The non-transitory computer readable media of claim 16, wherein adjusting the document object model includes replicating glyphs of the web asset in a node-based structure representation of the document object model.

18. The non-transitory computer readable media of claim 17, wherein adjusting the document object model includes assigning one or more colors to the replicated glyphs.

19. The non-transitory computer readable media of claim 15, wherein the color font file includes a font subset for presenting the content of the web asset.

20. The non-transitory computer readable media of claim 15, wherein the color font file includes scalable vector graphics.

21. The non-transitory computer readable media of claim 15, wherein positioning of the glyph spacing information as presented by the computing device is adjustable based upon user interaction.

22. A computer-implemented method comprising:
receiving information that indicates whether an asset presenter being executed by a computing device is capable of presenting one or more colored fonts of a web asset; and
in response to receiving the information, sending color font information to the computing device to allow content of the web asset represented in colored fonts to be presented by the computing device, sending the color font information includes sending glyph spacing information for layering with the color font information, the glyph spacing information being absent visual information.

23. The computer-implemented method of claim 22, wherein sending the font information includes sending an executable file to the computing device.

24. The computer-implemented method of claim 22, wherein sending the font information includes sending a color font file to the computing device.

25. The computer-implemented method of claim 24, wherein the color font file includes scalable vector graphics.

26. The computer-implemented method of claim 22, wherein positioning of the glyph spacing information as presented by the computing device is adjustable based upon user interaction.

27. A system comprising:
a computing device comprising:
a memory configured to store instructions; and
a processor to execute the instructions to perform operations comprising:
receiving information that indicates whether an asset presenter being executed by a computing device is capable of presenting one or more colored fonts of a web asset; and
in response to receiving the information, sending color font information to the computing device to allow content of the web asset represented in colored fonts to be presented by the computing device, sending the color font information includes sending glyph spacing information for layering with the color font information, the glyph spacing information being absent visual information.

28. The system of claim 27, wherein sending the font information includes sending an executable file to the computing device.

29. The system of claim 27, wherein sending the font information includes sending a color font file to the computing device.

30. The system of claim 29, wherein the color font file includes scalable vector graphics.

31. The system of claim 27, wherein positioning of the glyph spacing information as presented by the computing device is adjustable based upon user interaction.

32. One or more non-transitory computer readable media storing instructions that are executable by a processing device, and upon such execution cause the processing device to perform operations comprising:
receiving information that indicates whether an asset presenter being executed by a computing device is capable of presenting one or more colored fonts of a web asset; and
in response to receiving the information, sending font information to the computing device to allow content of the web asset represented in colored fonts to be presented by the computing device, sending the color font information includes sending glyph spacing information for layering with the color information, the glyph spacing information being absent visual information.

33. The non-transitory computer readable media of claim 32, wherein sending the font information includes sending an executable file to the computing device.

34. The non-transitory computer readable media of claim 32, wherein sending the font information includes sending a color font file to the computing device.

35. The non-transitory computer readable media of claim 34, wherein the color font file includes scalable vector graphics.

36. The non-transitory computer readable media of claim 32, wherein positioning of the glyph spacing information as presented by the computing device is adjustable based upon user interaction.

37. A computer-implemented method comprising:
receiving information that requests one or more colored fonts of a web asset for an asset presenter being executed by a computing device; and
in response to receiving the information, sending color font information to the computing device to allow content of the web asset represented in colored fonts to be presented by the computing device, wherein the color font information is provided by an executable file and a color font file, or, an executable file that includes content of the color font file, sending the color font information includes a file to the computing device that includes glyph spacing information and is absent glyph marking information, the glyph spacing information is layered with the color font information as presented by the computing device, the layering of the glyph spacing information and the color font information being adjustable based upon user interaction.

* * * * *

UNITED STATES PATENT AND TRADEMARK OFFICE
CERTIFICATE OF CORRECTION

PATENT NO. : 9,569,865 B2
APPLICATION NO. : 14/135973
DATED : February 14, 2017
INVENTOR(S) : Sampo Juhani Kaasila, Daniel Robert Orcutt and Mark Peter Lepper It is certified that error appears in the above-identified patent and that said Letters Patent is hereby corrected as shown below:

In the Claims

Column 24, Line 53, Claim 37, after "color" insert --font--.

Signed and Sealed this
Twenty-third Day of May, 2017

Michelle K. Lee
*Director of the United States Patent and Trademark Office*